US011899393B2

(12) United States Patent
Uyama et al.

(10) Patent No.: US 11,899,393 B2
(45) Date of Patent: Feb. 13, 2024

(54) PHOTOSENSITIVE MEMBER UNIT AND DEVELOPMENT UNIT

(71) Applicant: CANON KABUSHIKI KAISHA, Tokyo (JP)

(72) Inventors: Masao Uyama, Mishima (JP); Kenji Matsuda, Numazu (JP); Ken Kikuchi, Mishima (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/938,486

(22) Filed: Oct. 6, 2022

(65) Prior Publication Data

US 2023/0023224 A1 Jan. 26, 2023

Related U.S. Application Data

(60) Continuation of application No. 17/396,078, filed on Aug. 6, 2021, now Pat. No. 11,487,240, which is a (Continued)

(30) Foreign Application Priority Data

Apr. 17, 2017 (JP) ................................ 2017-081619

(51) Int. Cl.
*G03G 21/18* (2006.01)
*G03G 21/16* (2006.01)
*G03G 15/08* (2006.01)

(52) U.S. Cl.
CPC ..... *G03G 21/1814* (2013.01); *G03G 15/0806* (2013.01); *G03G 15/0896* (2013.01); (Continued)

(58) Field of Classification Search
CPC .......... G03G 15/0806; G03G 15/0896; G03G 21/1647; G03G 21/1652; G03G 21/1814; (Continued)

(56) References Cited

U.S. PATENT DOCUMENTS 9,383,720 B1 * 7/2016 Fukamachi ........ G03G 21/1821
2008/0310881 A1 12/2008 Sato
(Continued)

FOREIGN PATENT DOCUMENTS

JP 2002328586 A 11/2002
JP 2008026578 A 2/2008
JP 2010277079 A 12/2010

*Primary Examiner* — Sophia S Chen
(74) *Attorney, Agent, or Firm* — Canon U.S.A., Inc. IP Division

(57) ABSTRACT

A photosensitive member unit includes a photosensitive member, a transfer roller, a mounting portion capable of mounting a development unit including a development roller, a first gear and a second gear each provided at one end of the photosensitive member in an axial direction of the photosensitive member, and a third gear provided at one end of the transfer roller in an axial direction of the photosensitive member and configured to engage with the second gear. The first gear, the second gear, and the third gear are helical gears. A direction in which helical teeth of the first gear are inclined is opposite to a direction in which helical teeth of the second gear are inclined, and the direction in which the helical teeth of the first gear are inclined matches a direction in which helical teeth of the third gear are inclined.

15 Claims, 22 Drawing Sheets

Related U.S. Application Data continuation of application No. 16/925,154, filed on Jul. 9, 2020, now Pat. No. 11,119,442, which is a continuation of application No. 16/453,683, filed on Jun. 26, 2019, now Pat. No. 10,747,170, which is a division of application No. 15/953,732, filed on Apr. 16, 2018, now Pat. No. 10,372,079.

(52) U.S. Cl.
CPC ..... *G03G 21/1652* (2013.01); *G03G 21/1817* (2013.01); *G03G 21/1821* (2013.01); *G03G 21/1825* (2013.01); *G03G 21/1864* (2013.01); *G03G 2221/166* (2013.01); *G03G 2221/1853* (2013.01)

(58) Field of Classification Search
CPC ........... G03G 21/1817; G03G 21/1821; G03G 21/1825; G03G 21/1864; G03G 2221/166; G03G 2221/1853
See application file for complete search history.

(56) References Cited

U.S. PATENT DOCUMENTS

| | | | | |
|---|---|---|---|---|
| 2010/0303486 | A1 | 12/2010 | Shibata | |
| 2016/0349699 | A1* | 12/2016 | Miyamoto | G03G 21/1814 |
| 2016/0357140 | A1 | 12/2016 | Noda | |
| 2017/0269504 | A1* | 9/2017 | Abe | G03G 21/1821 |
| 2018/0095420 | A1* | 4/2018 | Abe | G03G 21/1821 |

* cited by examiner

PHOTOSENSITIVE MEMBER UNIT AND DEVELOPMENT UNIT

CROSS REFERENCE TO RELATED APPLICATIONS

The present application is a Continuation of U.S. patent application Ser. No. 17/396,078, filed on Aug. 6, 2021, which is a Continuation of U.S. patent application Ser. No. 16/925,154, filed on Jul. 9, 2020, issued as U.S. Pat. No. 11,119,442 on Sep. 14, 2021, which is a Continuation of U.S. patent application Ser. No. 16/453,683 filed Jun. 26, 2019, issued as U.S. Pat. No. 10,747,170 on Aug. 18, 2020, which is a Divisional of U.S. patent application Ser. No. 15/953,732 filed Apr. 16, 2018, issued as U.S. Pat. No. 10,372,079 on Aug. 6, 2019, which claims priority from Japanese Patent Application No. 2017-081619 filed Apr. 17, 2017, all of which are hereby incorporated by reference herein in their entirety.

BACKGROUND OF THE INVENTION

Field of the Invention

The present invention relates to a cartridge, such as a photosensitive member unit or a development unit, which is attachable to and detachable from an image forming apparatus of an electrophotographic system.

Description of the Related Art

In an image forming apparatus of an electrophotographic system, such as a laser beam printer or a copying machine, a toner image is formed on the surface of a photosensitive drum and the toner image is transferred onto a sheet, which is a recording material, thereby forming an image on the recording material.

Many laser beam printers adopt a system in which some of the components of an image forming apparatus are provided in a cartridge so as to facilitate maintenance and the cartridge is taken out of the apparatus main body to perform maintenance or replacement. Japanese Patent Application Laid-Open No. 2016-224221 discusses a process cartridge having a structure in which a development unit that accommodates toner is attachable to and detachable from a photosensitive member unit including a photosensitive drum.

However, in the process cartridge having a structure in which the development unit that accommodates toner is attachable to and detachable from the photosensitive member unit including the photosensitive drum, a further improvement may be necessary in terms of size, cost, accuracy, usability, and the like.

SUMMARY OF THE INVENTION

The present disclosure is directed to improving at least one of a photosensitive member unit and a development unit which constitute a process cartridge.

According to an aspect of the present invention, a photosensitive member unit includes a photosensitive member, a transfer roller, a first gear and a second gear each provided at one end of the photosensitive member in an axial direction of the photosensitive member, and a third gear provided at one end of the transfer roller in the axial direction of the photosensitive member and configured to engage with the second gear. The first gear, the second gear, and the third gear are helical gears. A direction in which helical teeth of the first gear are inclined is opposite to a direction in which helical teeth of the second gear are inclined, and the direction in which the helical teeth of the first gear are inclined matches a direction in which helical teeth of the third gear are inclined.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

DESCRIPTION OF THE EMBODIMENTS

Figure 1:
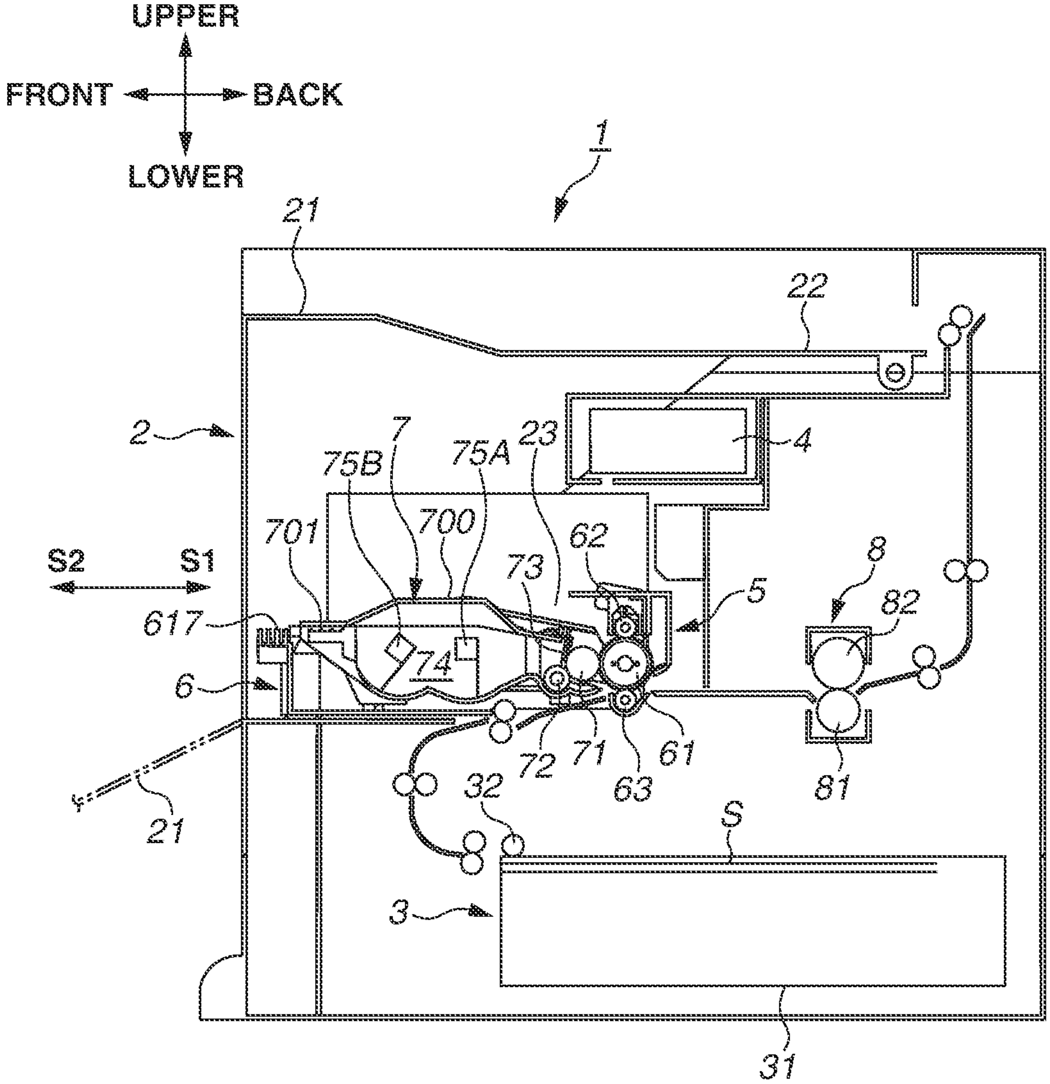
FIG. 1 is a sectional view of an image forming apparatus including a process cartridge.

A first exemplary embodiment of the present invention will be described in detail with reference to the drawings as appropriate.

In the following description, directions are defined based on a user who uses an image forming apparatus 1. More specifically, the front side of the image forming apparatus 1 is referred to as "front", the back surface side thereof is referred to as "back", the upper surface (top surface) side thereof is referred to as "upper", and the lower surface (bottom surface) side thereof is referred to as "lower". When the image forming apparatus 1 is viewed from the front side, the left side of the image forming apparatus 1 is referred to as "left" and the right side of the image forming apparatus 1 is referred to as "right". Also, for a process cartridge 5, the directions are defined in the same manner as of the image forming apparatus 1, assuming that the process cartridge 5 is in the same posture as the state in which the process cartridge 5 is mounted on the image forming apparatus 1. The directions in the drawings are defined by arrows illustrated in the drawings. A front-and-back direction, an up-and-down direction, and a right-and-left direction indicated by the arrows are directions orthogonal to each other. These directions are set in the same manner in all the drawings. The up-and-down direction is parallel to the vertical direction, and the right-and-left direction and the front-and-back direction are parallel to the horizontal direction. The right-and-left direction is parallel to each of a rotational axis direction of a photosensitive drum 61 and a rotational axis direction of a development roller 71. A structure in which a development unit 7 is integrally mounted on a photosensitive member unit 6 is referred to as the process cartridge 5. An insertion direction (mounting direction) S1 in which the process cartridge 5 is mounted on an apparatus main body 2 and a detaching direction S2 in which the process cartridge 5 is detached from the apparatus main body 2 are parallel to the front-and-back direction and orthogonal to each of the right-and-left direction and the up-and-down direction.

<Overall Configuration of Image Forming Apparatus>

FIG. 1 is a sectional view of the image forming apparatus 1 on which the process cartridge 5 is mounted, and the cross-section of the image forming apparatus 1 is parallel to each of the up-and-down direction and the front-and-back direction. As illustrated in FIG. 1, the image forming apparatus 1 mainly includes a sheet feed unit 3 for supplying sheets S into the apparatus main body 2, an exposure device 4, the process cartridge 5 for transferring a toner image onto each sheet S, and a fixing device 8 for heat-fixing the transferred toner image onto the sheet S.

The sheet feed unit 3 is provided at a lower portion within the apparatus main body 2, and mainly includes a sheet feed tray 31 and a sheet feeding mechanism 32. The sheets S accommodated in the sheet feed tray 31 are supplied to the process cartridge 5 (the photosensitive drum 61 and a transfer roller 63) by the sheet feeding mechanism 32.

The exposure device 4 is disposed at an upper portion within the apparatus main body 2 and includes a laser light emitting unit (not illustrated), a polygon mirror, a lens, a reflecting mirror, and the like (whose reference numerals are omitted). In the exposure device 4, laser light based on image data output from the laser light emitting unit is scanned at a high speed on the surface of the photosensitive drum 61, thereby exposing the surface of the photosensitive drum 61 to light.

The process cartridge 5 is disposed below the exposure device 4. The process cartridge 5 is inserted into an accommodation portion 23 of the apparatus main body 2 in the insertion direction S1 from an opening formed when a door (openable and closable member) 21, which is provided on the apparatus main body 2, is opened (as indicated by an alternate long and two short dashes line in FIG. 1), and the process cartridge 5 is mounted on the apparatus main body 2. When the process cartridge 5 is detached from the apparatus main body 2, the process cartridge 5 is moved and taken out in the detaching direction S2.

The process cartridge 5 mainly includes the photosensitive member unit 6 and the development unit 7. The photosensitive member unit 6 mainly includes the photosensitive drum 61, a charging roller 62, and the transfer roller 63. The development unit 7 is attachable to and detachable from the photosensitive member unit 6. The development unit 7 mainly includes a development roller 71, a supply roller 72, a layer thickness regulation blade 73, a toner accommodation portion (developer accommodation portion) 74 that accommodates toner (developer), and a first agitator 75A and a second agitator 75B, which are provided within the toner accommodation portion 74.

<Image Forming Process>

Next, an image forming process using the process cartridge 5 will be described. The photosensitive drum 61 is rotationally driven during execution of the image forming process. First, the surface of the photosensitive drum 61 is uniformly charged by the charging roller 62 and is then exposed to laser light corresponding to image data output from the exposure device 4, thereby forming an electrostatic latent image corresponding to the image data on the surface of the photosensitive drum 61.

Meanwhile, the toner accommodated in the toner accommodation portion 74 is agitated by the second agitator 75B and the first agitator 75A and is then supplied to the development roller 71 through the supply roller 72. The toner supplied to the development roller 71 enters the space between the development roller 71 and the layer thickness regulation blade 73 and is borne on the surface of the development roller 71 as a thin layer with a constant thickness.

The toner borne on the surface of the development roller 71 is supplied to the electrostatic latent image formed on the surface of the photosensitive drum 61. Thus, the toner is attached to the electrostatic latent image to form a visible image, so that a toner image is formed on the surface of the photosensitive drum 61. Then, the sheet S is conveyed to between the photosensitive drum 61 and the transfer roller 63, and the toner image formed on the surface of the photosensitive drum 61 is transferred onto the sheet S.

The fixing device 8 is disposed at the back side of the process cartridge 5 and mainly includes a heat roller 81 and a pressure roller 82. While the sheet S having the toner image transferred thereto passes through the fixing device 8, the sheet S is heated and pressed between the heat roller 81 and the pressure roller 82, and the toner image is fixed onto the sheet S. The sheet S that has passed through the fixing device 8 is discharged onto a sheet discharge tray 22.

<Configuration of Process Cartridge>

Next, each unit of the process cartridge 5 will be described. As described above, the process cartridge 5 includes the photosensitive member unit 6 and the development unit 7 that is attachable to and detachable from the photosensitive member unit 6.

<Configuration of Development Unit>

Figure 2A:
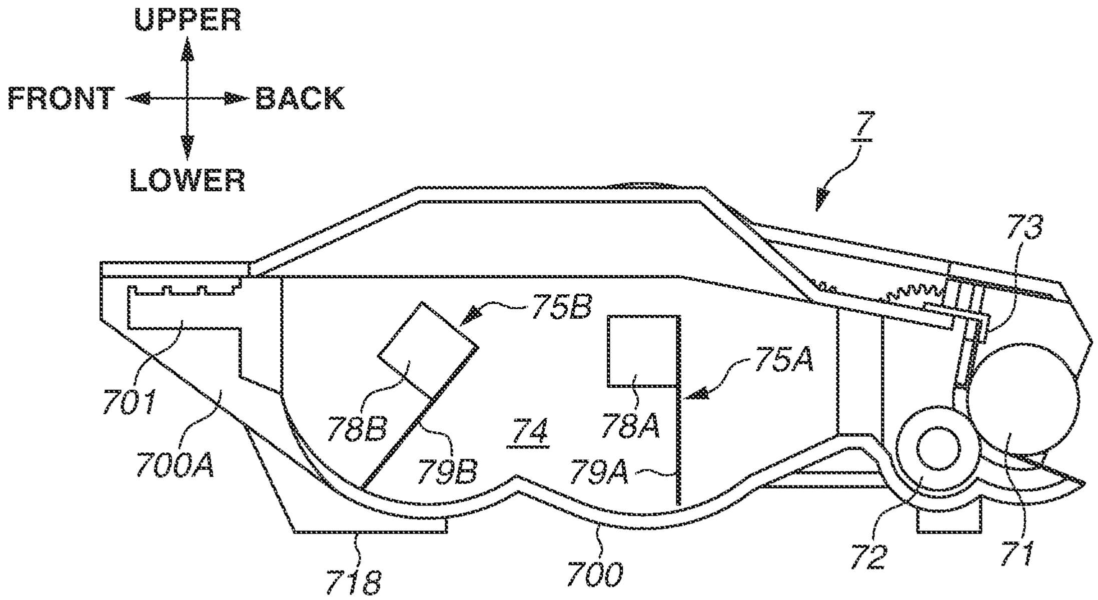
FIGS. 2A and 2B are sectional views each illustrating a development unit.
Figure 2B:
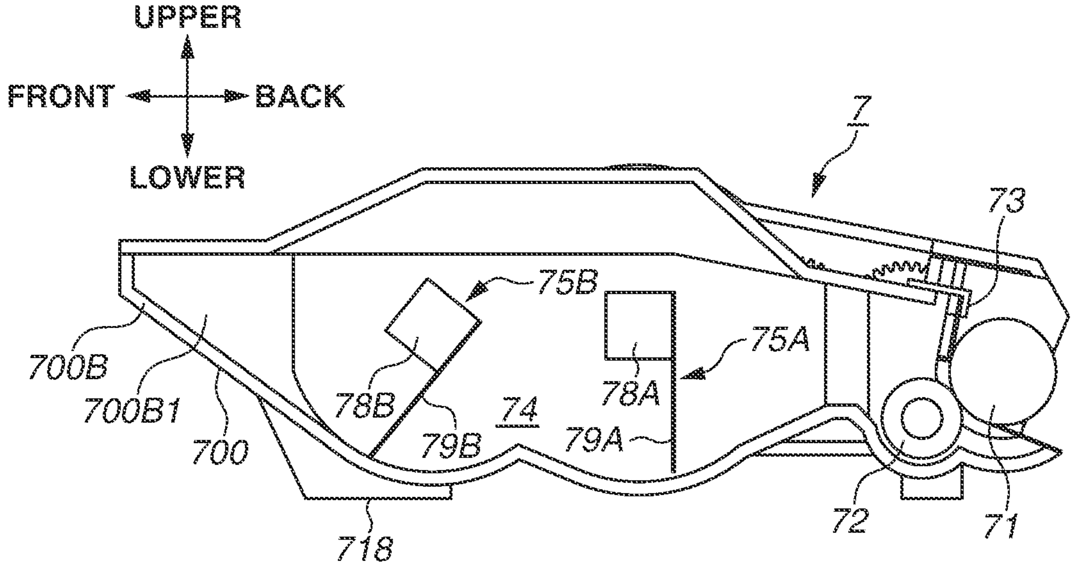
Figure 3:
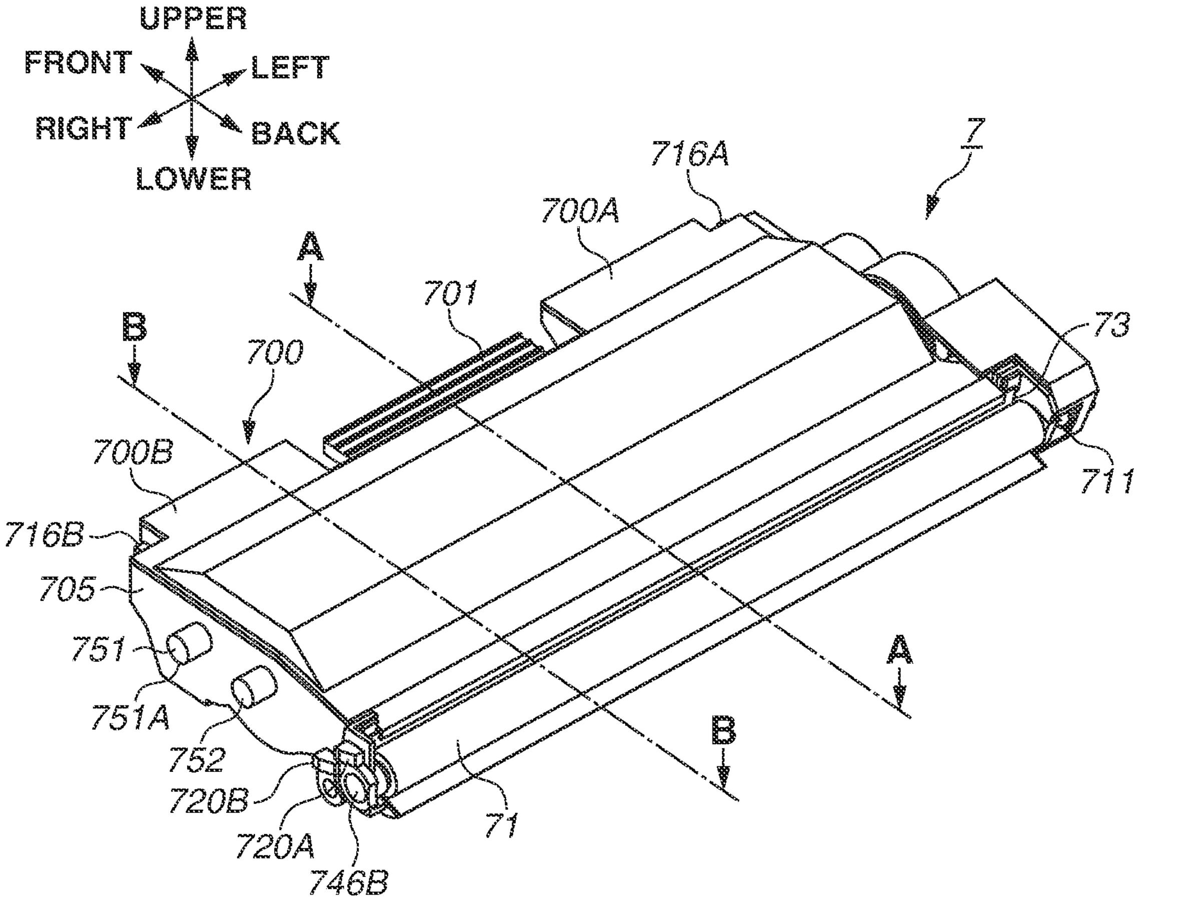
FIG. 3 is a perspective view of the development unit.
Figure 4:
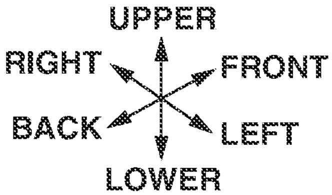
FIG. 4 is an exploded perspective view of the development unit.
Figure 4:
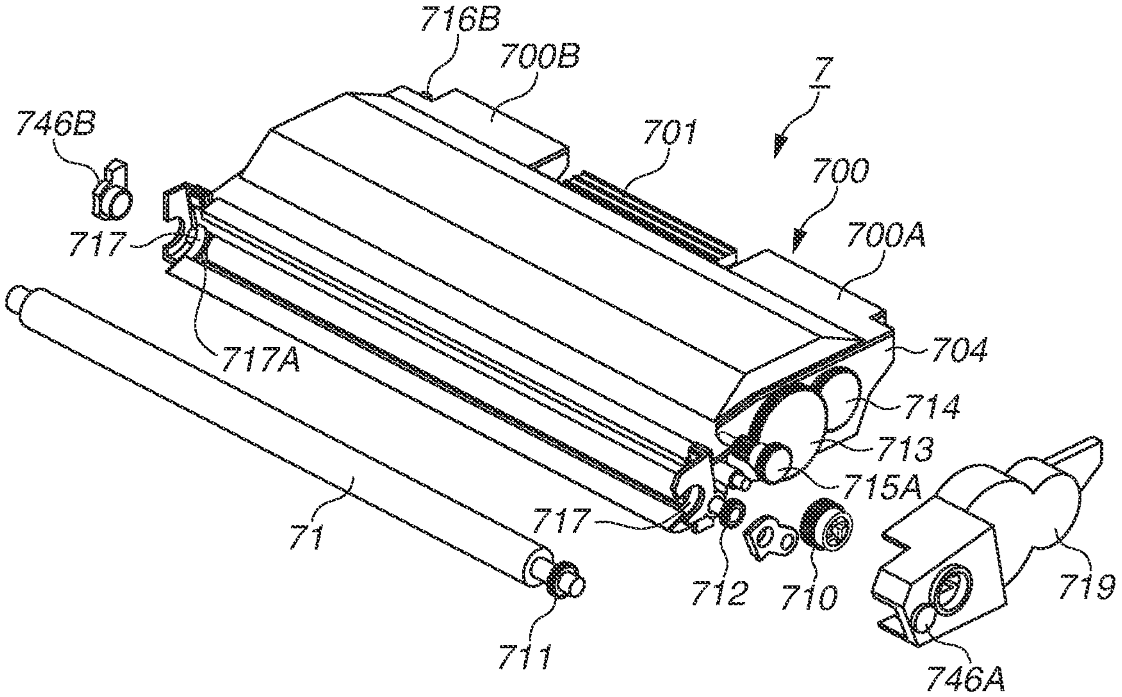
Figure 5:
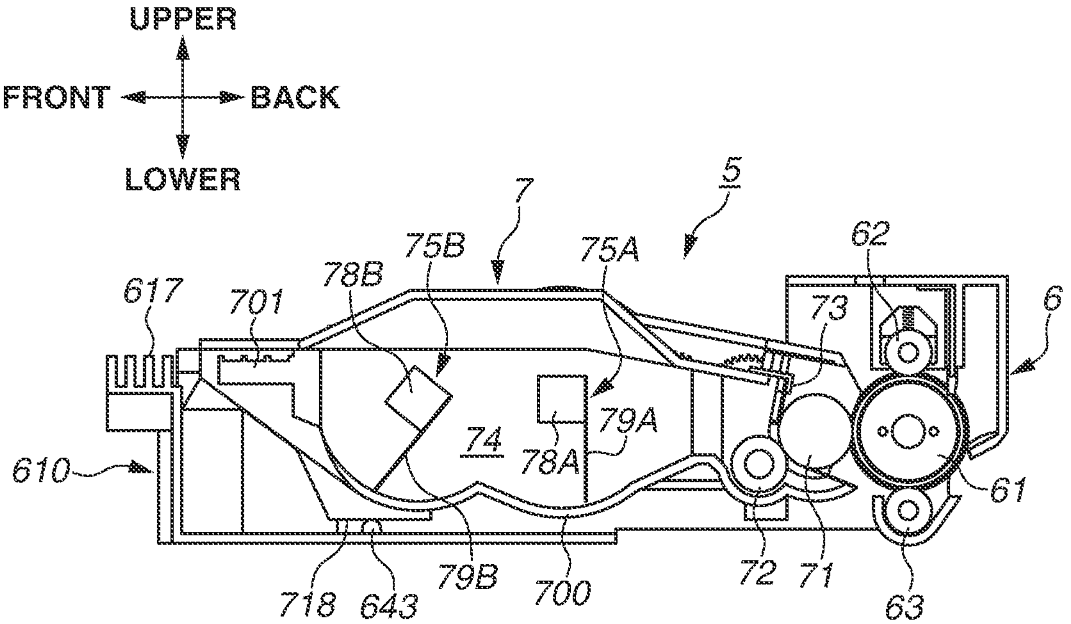
FIG. 5 is a sectional view of the process cartridge.
Figure 6:
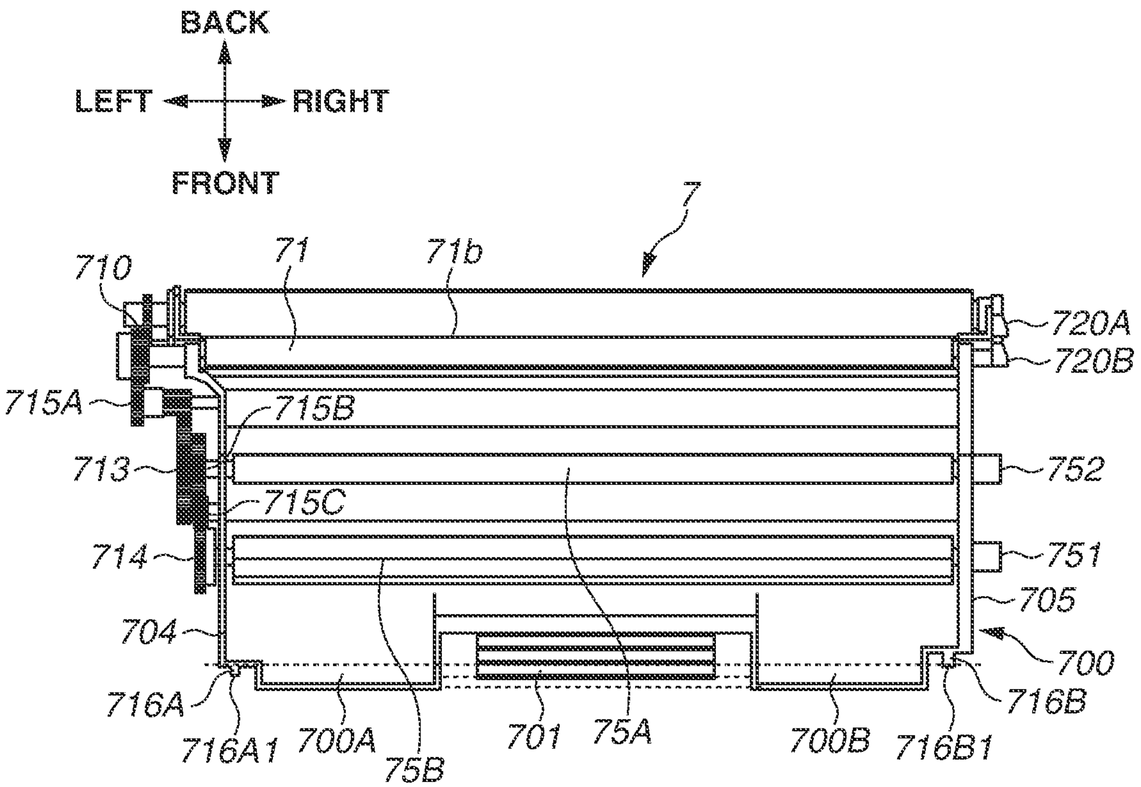
FIG. 6 is a top view of the development unit.
Figure 13:
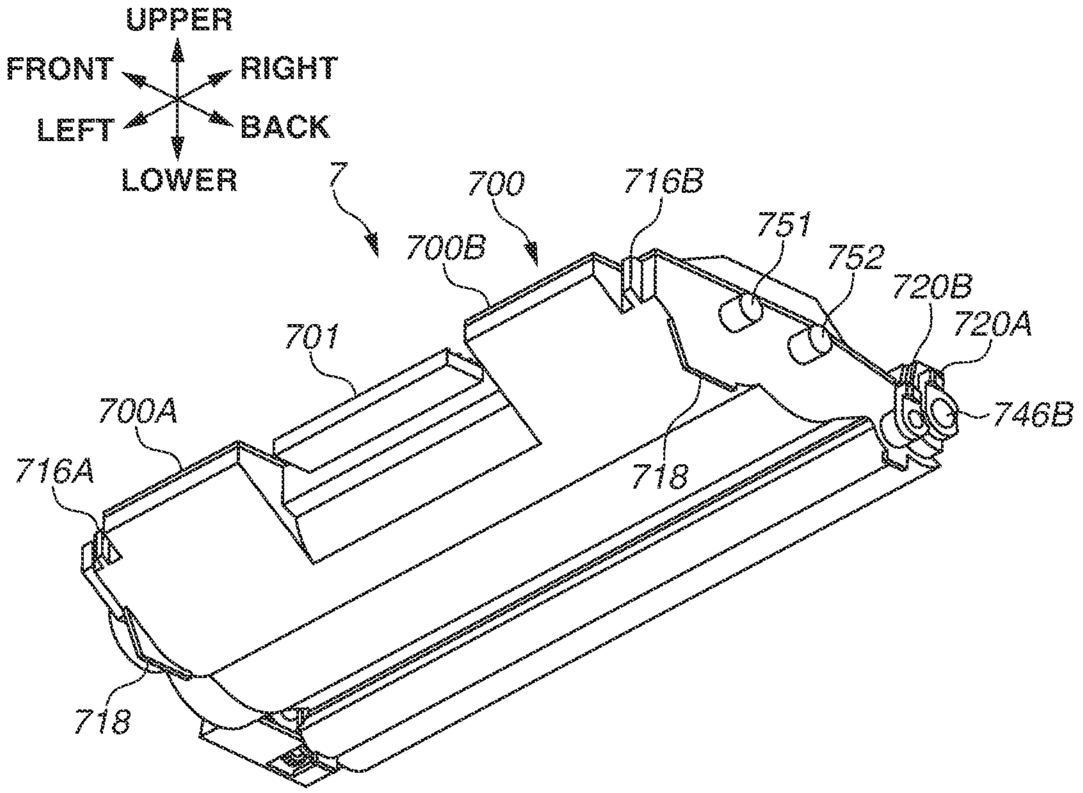
FIG. 13 is a perspective view of the development unit as viewed from below.

First, the configuration of the development unit 7 will be described. FIGS. 2A and 2B are sectional views each illustrating the development unit 7 placed on a horizontal plane. FIG. 2A is a sectional view taken along a line A-A of FIG. 3, and FIG. 2B is a sectional view taken along a line B-B of FIG. 3. The cross-section taken along the line A-A and the cross-section taken along the line B-B are parallel to each other in the up-and-down direction and the front-and-back direction. FIG. 3 is a perspective view of the development unit 7 placed on a horizontal plane. FIG. 4 is an exploded perspective view of the development unit 7. FIG. 5 is a sectional view of the development unit 7 that is mounted on the photosensitive member unit 6 placed on a horizontal plane, and the cross-section of the development unit 7 is parallel to each other in the up-and-down direction and the front-and-back direction. FIG. 6 is a top view of the development unit 7 and illustrates a state where the top surface of a housing 700 is removed for convenience of explanation. FIG. 13 is a perspective view of the development unit 7 as viewed from below.

As illustrated in FIGS. 2A and 2B, the development unit 7 includes a gripping portion 701 for the user to grip and is provided at the front side of the housing 700 serving as a development frame member. The development roller 71 is rotatably supported at the back side of the development unit 7. In the configuration of the development unit 7, the rotational axis direction of the development roller 71 is hereinafter referred to as an axial direction.

The gripping portion 701 is disposed at a position overlapping the housing 700 as viewed along a cross-section orthogonal to the axial direction. The gripping portion 701 is disposed substantially at a central portion of the housing 700 in the axial direction. More specifically, as illustrated in FIG. 3, the gripping portion 701 is disposed between a first housing portion 700A and a second housing portion 700B, which respectively include spaces and 700B1, to accommodate toner therein, in the axial direction. The space is an inside space of the first housing portion 700A. The illustration of the space is omitted because the arrangement relationship between the first housing portion 700A and the space is similar to the arrangement relationship between the second housing portion 700B and the space 700B1 illustrated in FIG. 2B.

With this configuration, a peripheral space of the gripping portion 701 can be used as a toner accommodation space. If there is a limitation on the width of the development unit in the front-and-back direction, the employment of the configuration according to the present exemplary embodiment enables accommodation of a larger amount of toner in this way. The advantageous effect described above can be obtained as long as at least a part of the gripping portion 701 overlaps the first housing portion 700A and the second housing portion 700B as viewed along the cross-section orthogonal to the axial direction. To accommodate a larger amount of toner, the length of the gripping portion 701 in the axial direction is desirably set as small as possible without impairing the usability.

As illustrated in FIGS. 4 and 6, both ends of each of the development roller 71, the supply roller 72, the first agitator (first agitation member) 75A, and the second agitator (second agitation member) 75B are rotatably supported on a left side wall 704 and a right side wall 705 of the housing 700. On the left side of the left side wall 704 of the housing 700, a development coupling 710, a development roller gear 711, a supply roller gear 712, a first agitator gear 713, a second agitator gear 714, and idle gears 715A, 715B, and 715C are provided. The development roller gear 711 is fixed to an end of the development roller 71, and the supply roller gear 712 is fixed to an end of the supply roller 72. The first agitator gear 713 is fixed to an end of an agitation bar 78A (see FIG. 5) of the first agitator 75A, and the second agitator gear 714 is fixed to an end of an agitation bar 78B (see FIG. 5) of the second agitator 75B.

A development drive transmission member (not illustrated) provided on the apparatus main body 2 moves to a position to engage with the development coupling 710 interlocking with an operation of closing a door 21 provided on the apparatus main body 2. This causes the development drive transmission member to press the development coupling 710 to the right side, so that the housing 700 contacts a right side wall 612 (see FIG. 8) of the photosensitive member unit 6. On the other hand, the development drive transmission member moves to a position to release the engagement with the development coupling 710 interlocking with an operation of opening the door 21.

When the door 21 is closed, a driving force is transmitted (input) to the development coupling 710, which is a driving force receiving member, from the development drive transmission member, and the development roller 71 becomes rotatable through the development roller gear 711 from a gear that is provided on the peripheral surface of the development coupling 710, and the supply roller 72 becomes rotatable through the supply roller gear 712. The development drive transmission member is configured to permit positional deviation of the development coupling 710 within a predetermined range and is capable of transmitting the driving force to the development coupling 710. The movement of each of the development coupling 710, the development roller gear 711, and the supply roller gear 712 in the axial direction is regulated by a side holder 719 attached to the housing 700.

To reduce the height of the apparatus main body 2 while enabling accommodation of a larger amount of toner, it is important to reduce the height of the development unit 7. Accordingly, as illustrated in FIG. 5, it is necessary to dispose the development unit 7 to be substantially horizontal in a state where the development unit 7 is mounted on the photosensitive member unit 6. The development unit 7 includes two agitators, i.e., the first agitator 75A and the second agitator 75B, to agitate the toner accommodated in the toner accommodation portion 74 so that the toner can be used up. The first agitator 75A includes the agitation bar 78A and an agitation sheet 79A. The first agitator 75A is configured to be rotatable by receiving, with the first agitator gear 713, the driving force from the development coupling 710 through the idle gear 715A. The second agitator 75B includes the agitation bar 78B and an agitation sheet 79B. The second agitator 75B is configured to be rotatable by receiving, with the second agitator gear 714, the driving force from the first agitator gear 713 through the idle gears 715B and 715C.

The second agitator 75B supplies the first agitator 75A with the toner accommodated in the toner accommodation portion 74. The toner located near the first agitator 75A within the toner accommodation portion 74 is agitated by the first agitator 75A and supplied to the supply roller 72 and further supplied to the development roller 71 by the supply roller 72.

<Configuration of Photosensitive Member Unit>

Figure 8:
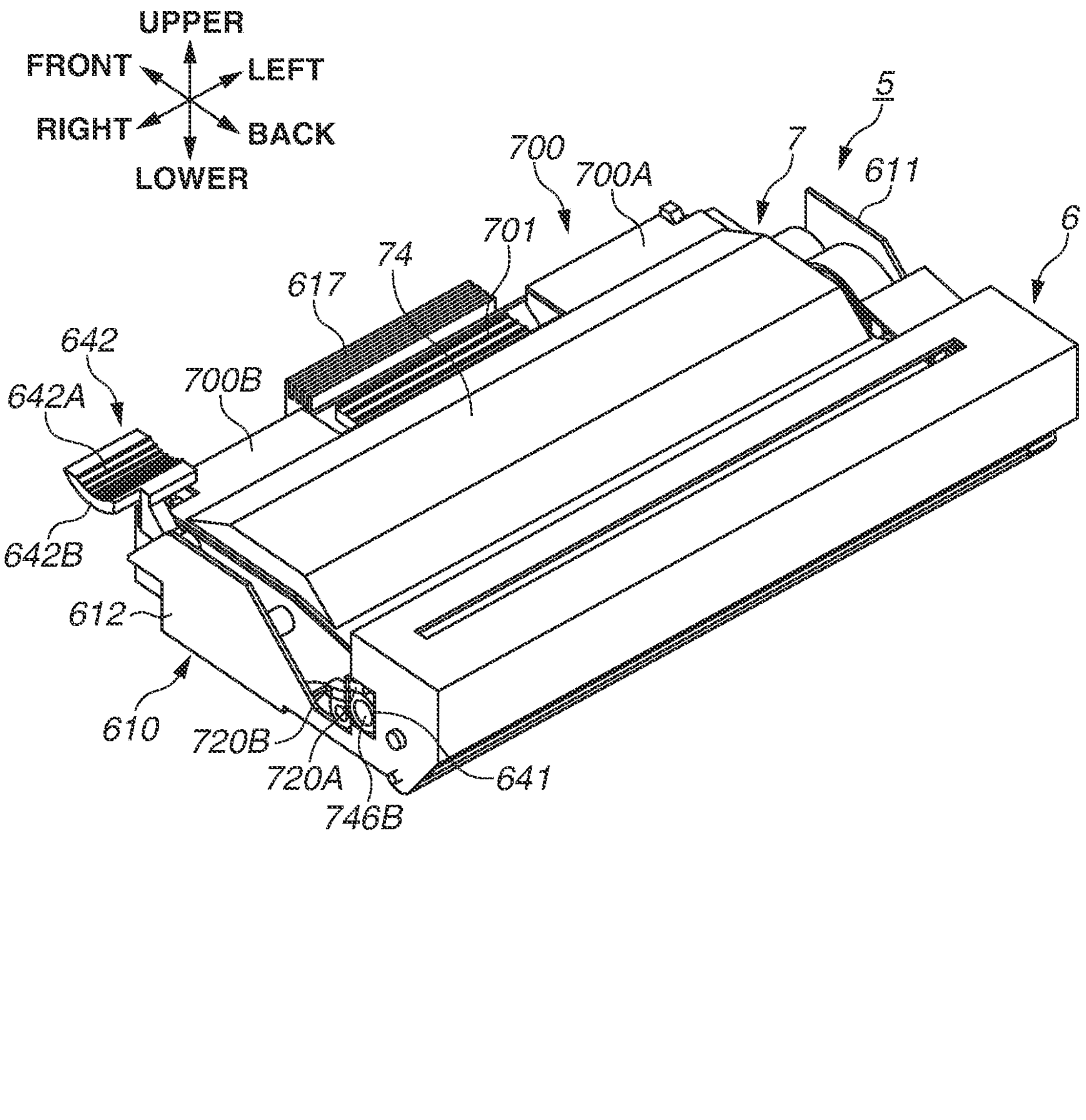
FIG. 8 is a perspective view of the process cartridge.
Figure 9:
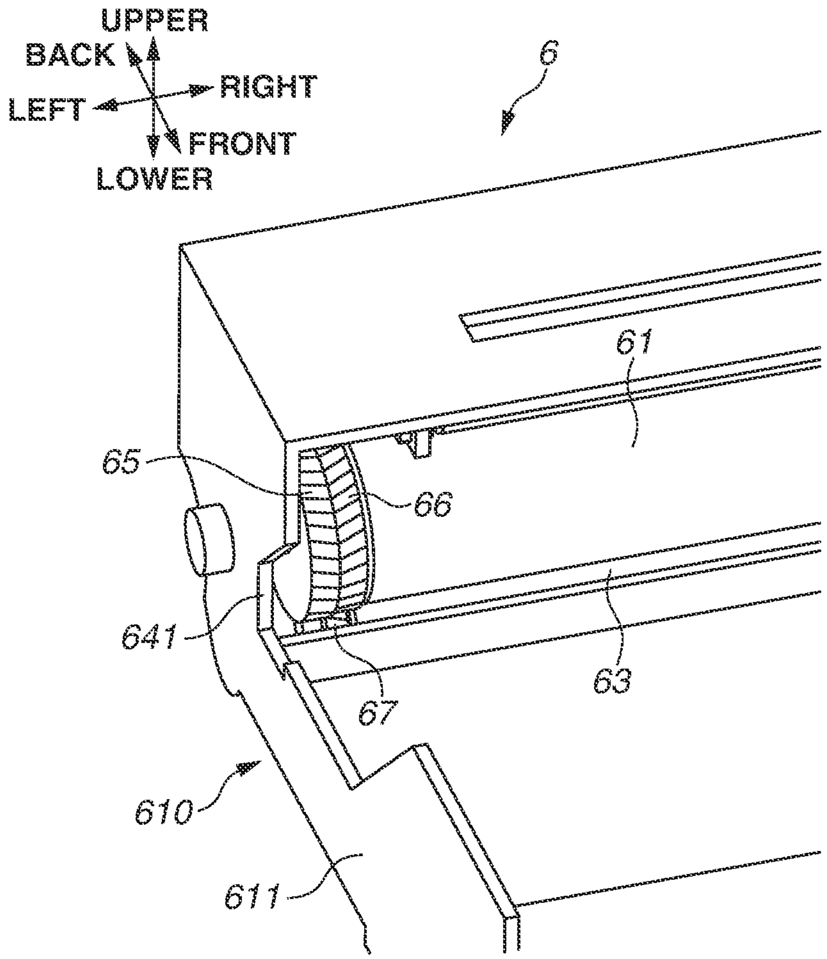
FIG. 9 is a partial perspective view of the photosensitive member unit.
Figure 10:
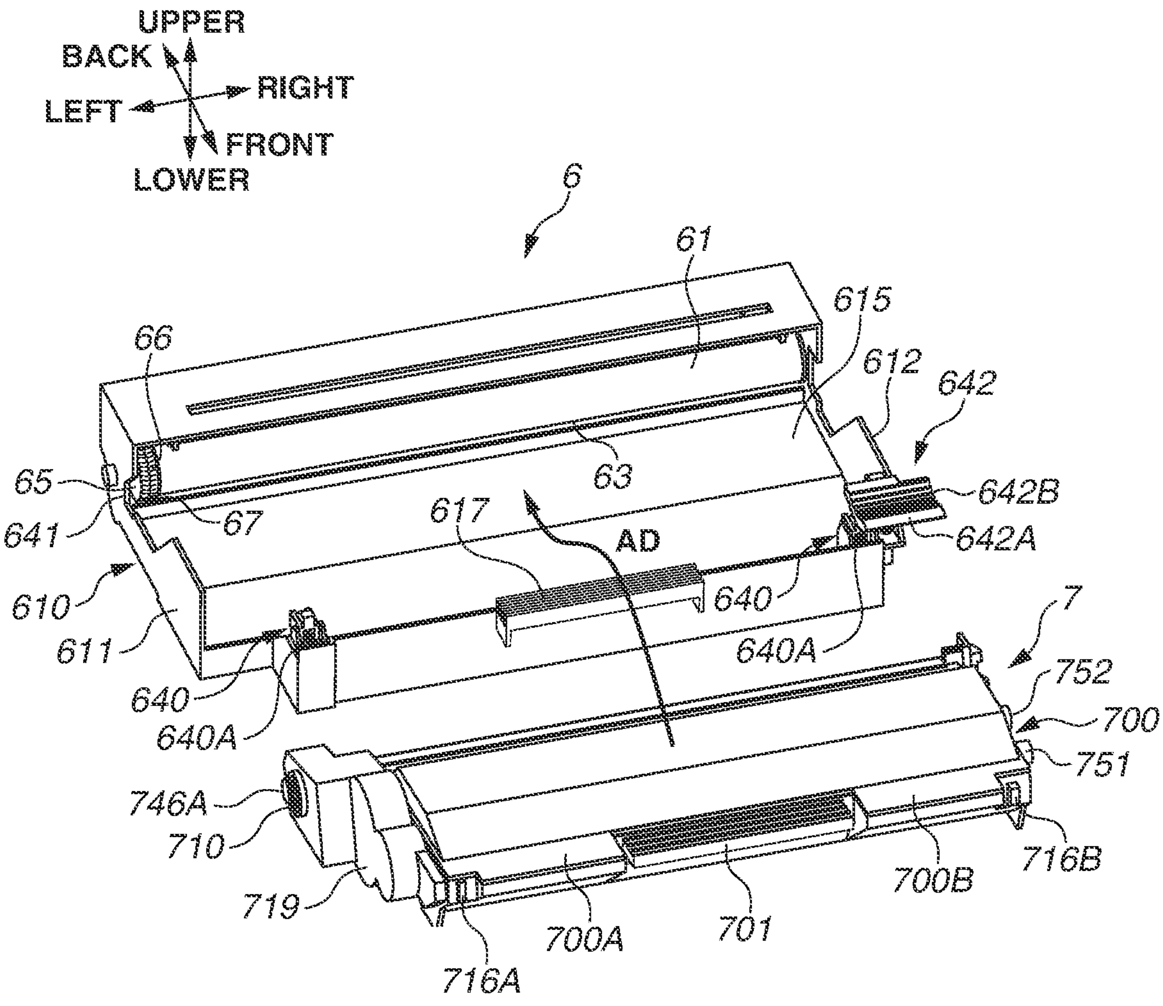
FIG. 10 is a perspective view illustrating the development unit and the photosensitive member unit.
Figure 11:
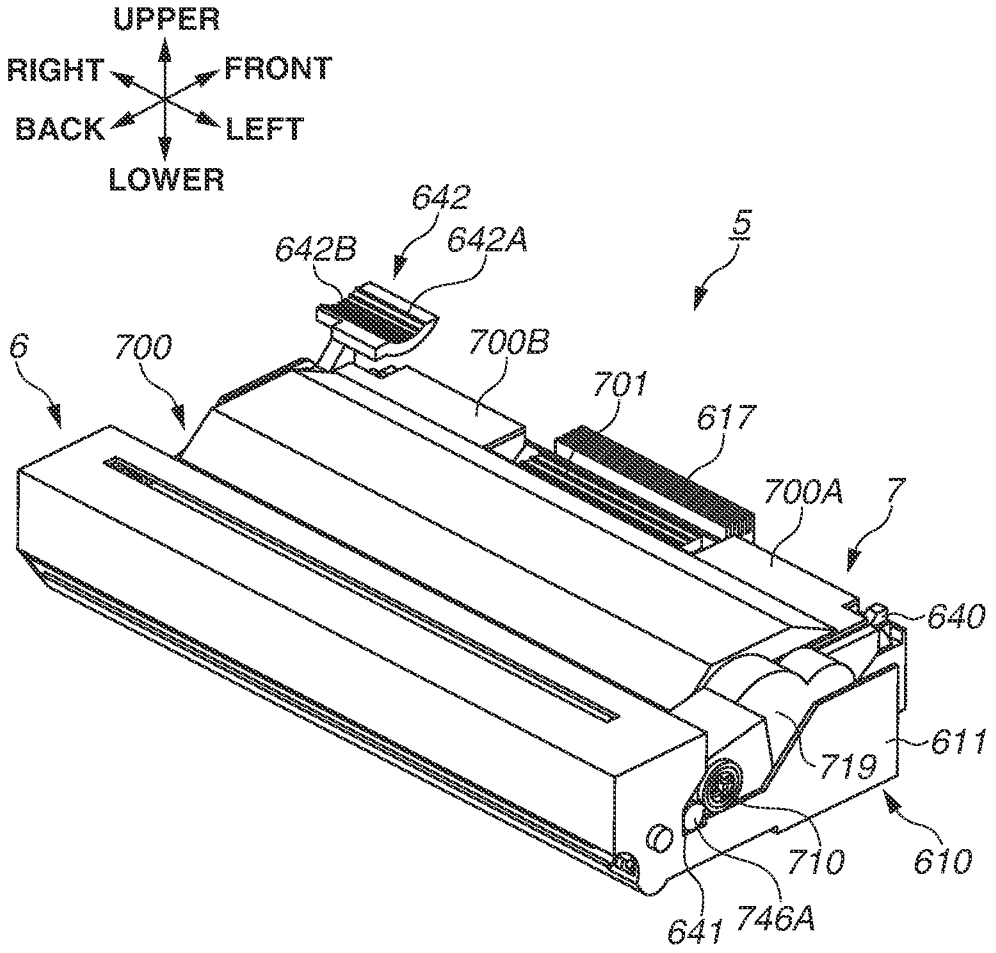
FIG. 11 is a perspective view of the process cartridge.
Figure 12:
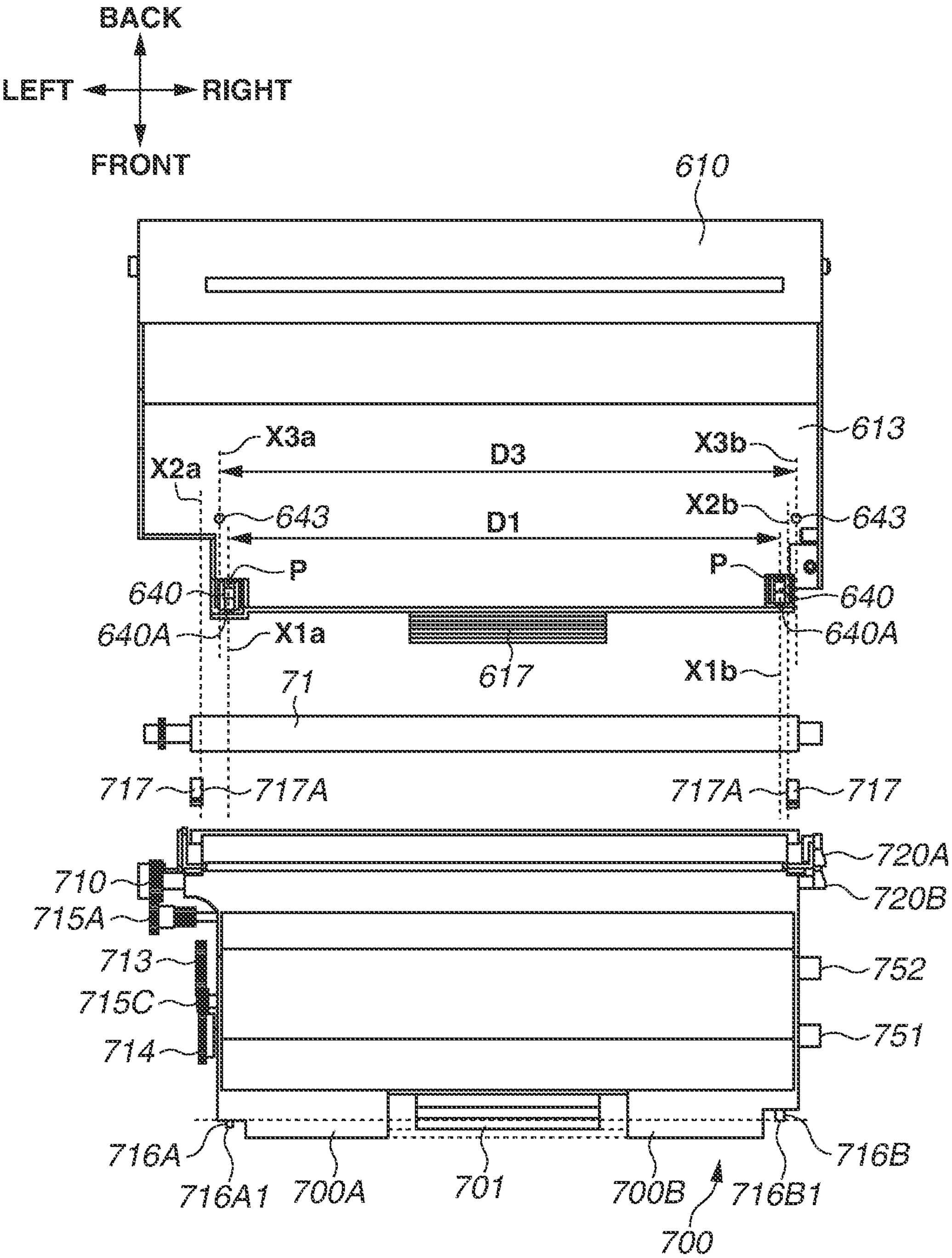
FIG. 12 is a top view illustrating an arrangement relationship among the photosensitive member unit, the development unit, a development roller, and end seals in a right-and-left direction.

Next, the detailed configuration of the photosensitive member unit 6 will be described. FIG. 8 is a perspective view of the process cartridge 5 placed on a horizontal plane. FIG. 9 is a partial perspective view of the photosensitive member unit 6 placed on a horizontal plane. FIG. 10 is a perspective view illustrating the development unit 7 and the photosensitive member unit 6 placed on a horizontal plane. FIG. 11 is a perspective view of the process cartridge 5 placed on a horizontal plane. FIG. 12 is a top view illustrating the arrangement relationship between the photosensitive member unit 6, the development unit 7, the development roller 71, and end seals 717 in the right-and-left direction. For convenience of explanation, FIG. 12 illustrates a state where the development roller 71 and the end seals 717 are taken out of the development unit 7 without changing the positions of the development roller 71 and the end seals 717 in the right-and-left direction.

As illustrated in FIG. 8, the photosensitive member unit 6 mainly includes a frame 610 including a pair of side walls, i.e. a left side wall 611 and a right side wall 612, and a photosensitive drum 61 that is rotatably supported at the back side of the frame 610. On the front side of the frame 610, a mounting portion 615 on which the development unit 7 is mountable, a gripping portion 617 that is used by the user to grip, pressing members 640 that press the development unit 7, and a lift member (movable member) 642 that lifts the development unit 7, are provided. The lift member 642 lifts the development unit 7 that is mounted on the mounting portion 615. The toner accommodation portion 74 of the development unit 7 that is mounted on the mounting portion 615 is disposed between the left side wall 611 and the right side wall 612 in the right-and-left direction.

The lifetime of the development unit 7 that is determined depending on the amount of toner accommodated in the development unit 7 is set to be shorter than the lifetime of the photosensitive member unit 6 that is determined depending on the thickness of a photosensitive layer of the photosensitive drum 61. Accordingly, it is necessary to replace only the development unit 7 that has reached the lifetime, separately from the photosensitive member unit 6. In this case, the door 21 is opened to take the process cartridge 5 out of the apparatus main body 2 and detach the development unit 7, which has reached the lifetime, from the photosensitive member unit 6. As indicated by a mounting direction AD in FIG. 10, another development unit 7 is attached to the photosensitive member unit 6. After that, the photosensitive member unit 6 on which the development unit 7 is mounted is mounted on the apparatus main body 2 as the process cartridge 5.

As illustrated in FIGS. 8, 10, and 11, the left side wall 611 and the right side wall 612 of the frame 610 are respectively provided with receiving portions 641 that respectively receive rotary bearing members 746A and 746B of the development roller 71 that is formed on the front side of the photosensitive drum 61. Each receiving portion 641 is a recessed portion which has substantially a U-shape and is opened on the front side thereof as viewed from the left side. In the process of mounting the development unit 7 on the photosensitive member unit 6, a rotation shaft of the development roller 71 is inserted into the receiving portions 641. The receiving portions 641 guide the movement of the development unit 7 illustrated in FIG. 10 in the mounting direction AD.

As illustrated in FIG. 12, the pressing members 640 are respectively provided at both ends in the right-and-left direction on the front side of the frame 610 and are urged in the front-to-back direction by compression springs 640A each serving as an urging member. Thus, urging forces of the compression springs 640A cause the pressing members 640 to press pressed ribs 716A and 716B, which are respectively provided on the first housing portion 700A and the second housing portion 700B of the housing 700 of the development unit 7. The pressing members 640 press the development unit 7, thereby urging the development roller 71 to the photosensitive drum 61.

As illustrated in FIG. 9, a photosensitive member gear (first gear) 65 of helical teeth and a transfer gear (second gear) 66 of helical teeth are fixed to the left end of the photosensitive drum 61 and configured to rotate integrally with the photosensitive drum 61. When the process cartridge 5 is mounted on the apparatus main body 2, a drive gear (not illustrated) of the apparatus main body 2 engages with a photosensitive member gear 65 and a driving force is transmitted to each of the photosensitive drum 61 and a transfer gear 66, thereby allowing the photosensitive drum 61 and the transfer gear 66 to rotate. Further, the transfer gear 66 engages with a transfer roller gear (third gear) 67 that is fixed to the left end of the transfer roller 63, thereby allowing the transfer roller 63 to rotate.

When the driving force is transmitted, the photosensitive drum 61 receives a force to be pressed to the right side due to the action of the helical teeth of the photosensitive member gear 65. A direction in which the helical teeth of the transfer gear 66 are inclined is set to be opposite to a direction in which the helical teeth of the photosensitive member gear 65 are inclined. A direction in which the helical teeth of the transfer roller gear 67 are inclined is set to be the same as a direction in which the helical teeth of the photosensitive member gear 65 are inclined. Accordingly, the transfer roller 63 receives a force to be pressed to the right side due to the action of the helical teeth of the transfer roller gear 67. With this configuration, the transfer roller 63 is urged in the same direction (right side) as the photosensitive drum 61. As a result, the photosensitive drum 61 and the transfer roller 63 can contact the right side wall 612 of the frame 610 and can be positioned in the rotational axis direction of the photosensitive drum 61. Accordingly, the excellent positional accuracy of the transfer roller 63 with respect to the photosensitive drum 61 can be obtained. As a result, a tolerance in design that needs to be taken into consideration can be reduced, which leads to downsizing and cost reduction of the transfer roller 63 and the like. Since the transfer roller gear 67 has helical teeth, the position of the transfer roller 63 in the rotational axis direction (right-and-left direction) is stabilized during the rotation of the transfer roller 63, and thus an image defect is less likely to occur.

When the development unit 7 is mounted on the mounting portion 615, the development coupling 710 is disposed at a position closer to the left end of the photosensitive drum 61 than the right end thereof in the rotational axis direction of the photosensitive drum 61. Therefore, the development coupling 710 is pressed to the right side by the development drive transmission member (not illustrated) interlocking with the operation of closing the door 21 that is provided on the apparatus main body 2, and the housing 700 of the development unit 7 contacts the right side wall 612. In this way, like the photosensitive drum 61 and the transfer roller 63, the development unit 7 also can contact the right side wall 612 and can be positioned in the rotational axis direction. Therefore, the excellent positional accuracy of the development unit 7 with respect to the photosensitive drum 61 and the transfer roller 63 can be obtained.

The size of the outer diameter of the transfer gear 66 is set to be smaller than the size of the outer diameter of the photosensitive member gear 65. With this configuration, the photosensitive member gear 65 can reliably engage with the drive gear of the apparatus main body 2. In the rotational axis direction of the photosensitive drum 61, the direction in which each of the photosensitive drum 61 and the transfer roller 63 is urged by the urging force of the helical gear is not limited to the right side, but instead may be the left side.

As illustrated in FIG. 8, in the state where the development unit 7 is mounted on the photosensitive member unit 6, the gripping portion 617 of the photosensitive member unit 6 is disposed on the front side of the gripping portion 701 of the development unit 7. The length of the gripping portion 617 in the right-and-left direction is set to be longer than the length of the gripping portion 701 in the right-and-left direction. In this case, the weight of the photosensitive member unit 6 on which the development unit 7 is mounted is heavier than the weight of the development unit 7 alone. If the length of the gripping portion 617 is longer than the length of the gripping portion 701 in the right-and-left direction as described above, when the user grips the photosensitive member unit 6 on which the development unit 7 is mounted and which is heavier than the development unit 7 alone, the user can grip the gripping portion 617 more stably than in the case of gripping the gripping portion 701. Consequently, the excellent usability for the user to treat the process cartridge 5 can be obtained.

<Positional Relationship between Each Bias Contact and Development coupling 710>

Figure 20:
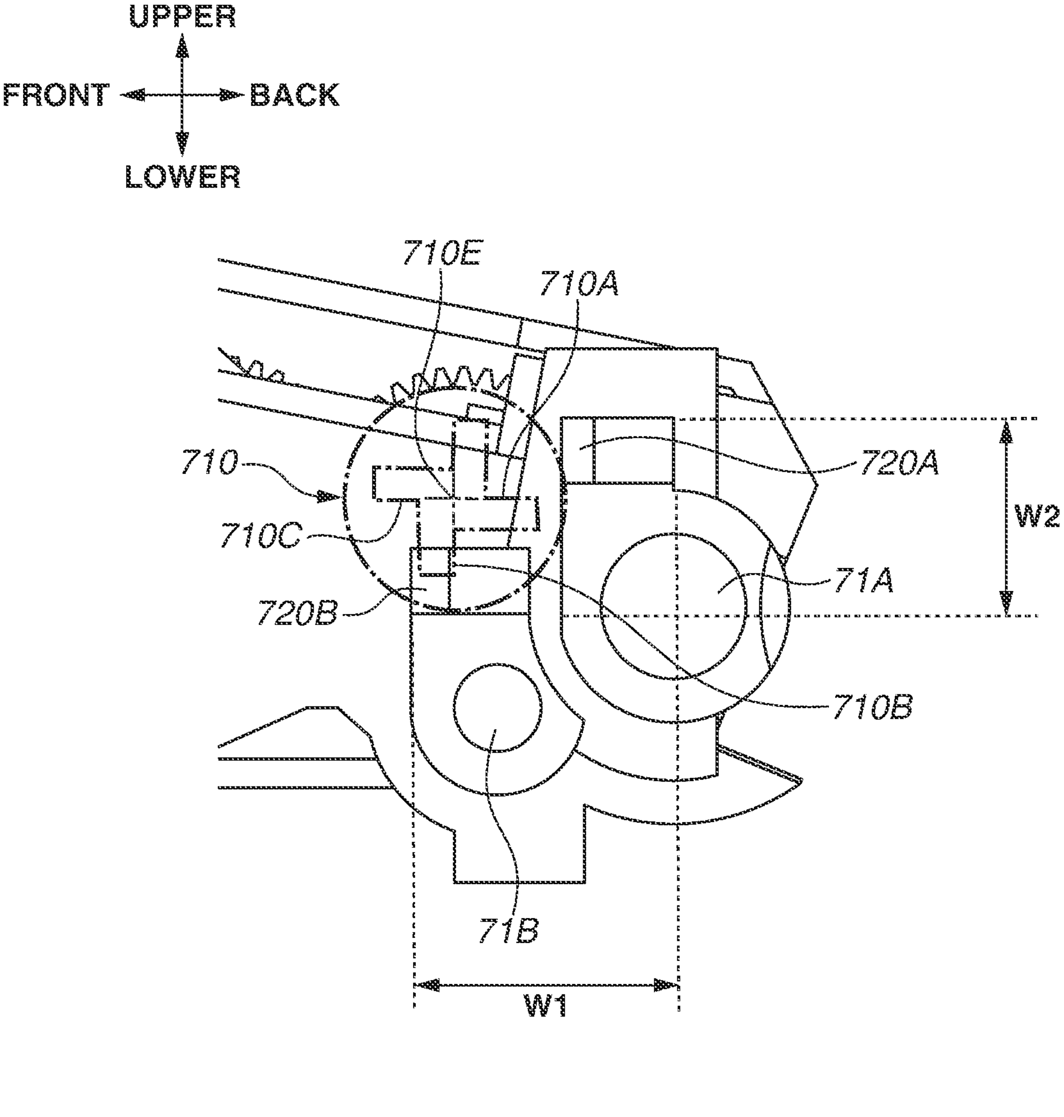
FIG. 20 is a view illustrating a part of the development unit placed on a horizontal plane as viewed from the right side.

FIG. 20 is a view illustrating a part of the development unit 7 placed on a horizontal plane as viewed from the right side in the rotational axis direction of the development roller 71. The development unit 7 is provided with a first electrical contact 720A that is electrically connected to the development roller 71 and supplied with a voltage to be applied to the development roller 71, and a second electrical contact 720B that is electrically connected to the supply roller 72 and supplied with a voltage to be applied to the supply roller 72. These electrical contacts contact a power supply contacts (not illustrated), which is provided on the apparatus main body 2, to thereby supply power to each of the development roller 71 and the supply roller 72.

In FIG. 20, a driving force receiving portion of the development coupling 710 and a rotation center 710E thereof are indicated by an alternate long and short dash line to illustrate the arrangement relationship between the development coupling (driving force receiving member) 710, the first electrical contact 720A, and the second electrical contact 720B in the up-and-down direction and the front-and-back direction. As illustrated in FIG. 20, the rotation center 710E is disposed within a region which has a width W1 and in which the first electrical contact 720A and the second electrical contact 720B are disposed in the front-and-back direction (horizontal direction). Further, the rotation center 710E is disposed within a region which has a width W2 and in which the first electrical contact 720A and the second electrical contact 720B are disposed in the up-and-down direction (vertical direction). The width W1 is a distance between the frontmost end and the backmost end of the first electrical contact 720A and the second electrical contact 720B in the front-and-back direction. The width W2 is a distance between the uppermost end and the lowermost end of the first electrical contact 720A and the second electrical contact 720B in the up-and-down direction. The region in which the first electrical contact 720A and the second electrical contact 720B are disposed in the front-and-back direction and the up-and-down direction is a region that is located within the width W1 in the front-and-back direction and located within the width W2 in the up-and-down direction. With this configuration, the development coupling 710, the first electrical contact 720A, and the second electrical contact 720B, each of which needs to contact the apparatus main body 2, can be disposed substantially at the same position in the up-and-down direction and the front-and-back direction. Accordingly, an increase in the size of the development unit 7 in the up-and-down direction and the front-and-back direction can be suppressed.

A voltage to be applied to a development blade that regulates the thickness of the toner borne on the surface of the development roller 71 may be supplied from the second electrical contact 720B.

<Pressing Configuration of Development Unit 7>

Figure 15:
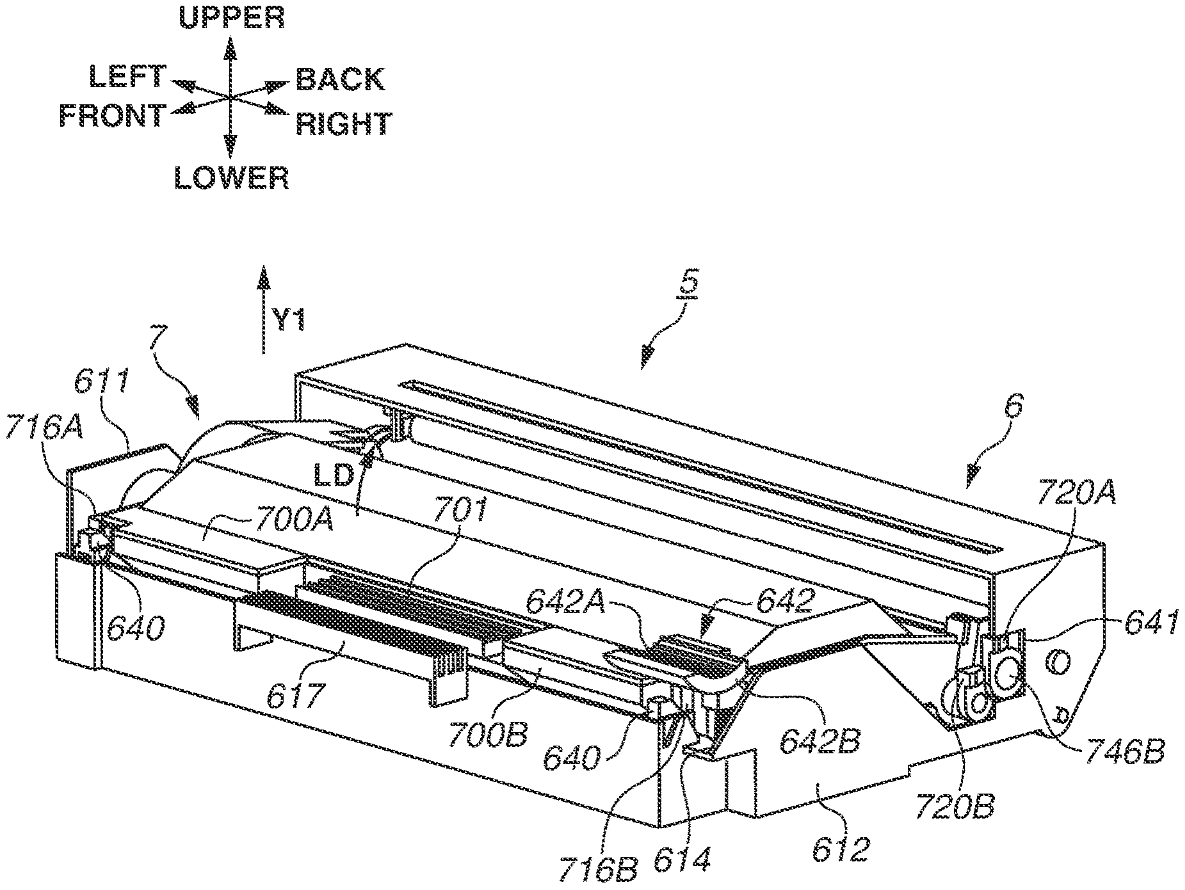
FIG. 15 is a perspective view illustrating the development unit and the photosensitive member unit.
Figure 19:
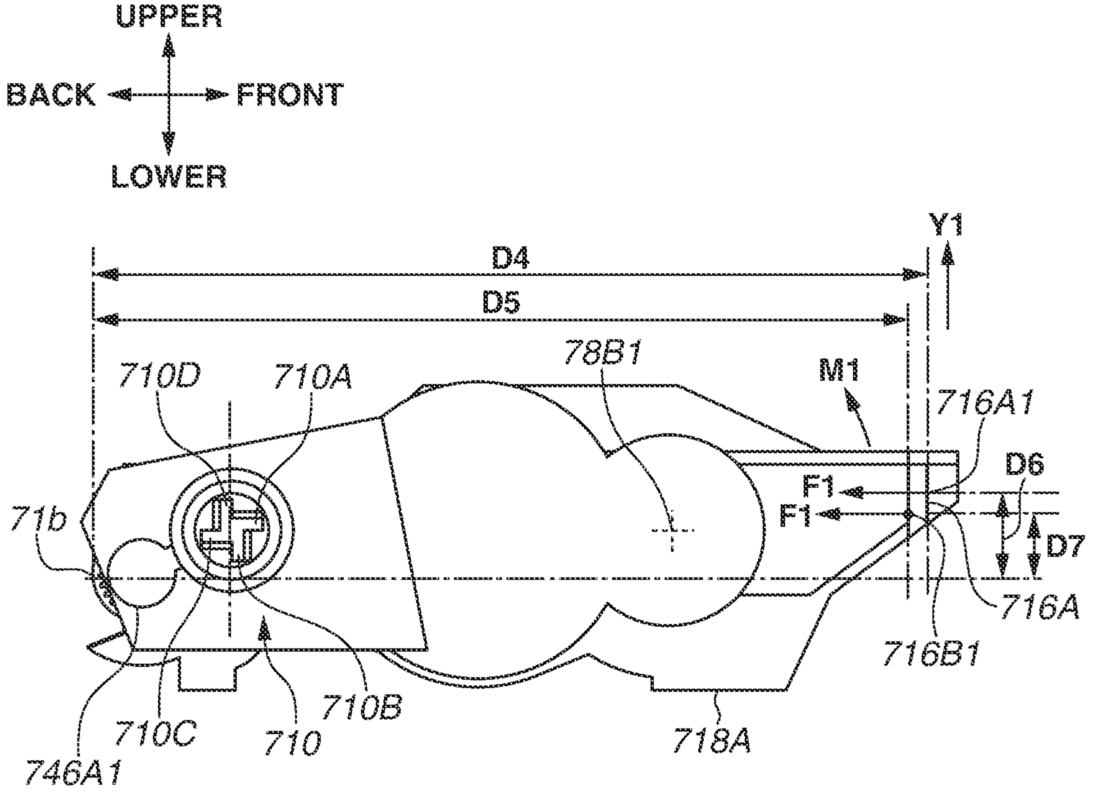
FIG. 19 is a view illustrating the development unit as viewed from the right side.

Next, the pressed ribs 716A and 716B serving as pressed portions of the development unit 7 will be described with reference to FIGS. 6, 15, and 19. FIG. 15 is a perspective view of the photosensitive member unit 6 placed on a horizontal plane on which the development unit 7 is mounted. FIG. 19 is a side view of the development unit 7 placed on a horizontal plane as viewed from the left side. As illustrated in FIG. 6, the pressed ribs 716A and 716B, which are respectively located close to the left side wall 704 and the right side wall 705 of the housing 700 and have a relatively high strength in the front-and-back direction, are provided at both ends in the right-and-left direction. With this configuration, the strength of the housing 700 can be secured and deformation of the housing 700 due to the pressing force of each pressing member 640 can be suppressed.

A portion of the pressed rib 716A that contacts the pressing member 640 and is pressed by the pressing member 640 is referred to as a pressed portion 716A1 (first pressed portion), and a portion of the pressed rib 716B that contacts the pressing member 640 and is pressed by the pressing member 640 is referred to as a pressed portion 716B1 (second pressed portion). A contact portion of the development roller 71 that contacts the photosensitive drum 62 is referred to as a contact portion 71*b*. In order to stably press the development roller 71 against the photosensitive drum 61 in the pressing direction of each pressing member 640, the pressed portions 716A1 and 716B1 are preferably set as far from the contact portion 71*b* as possible. In other words, as the pressed portions 716A1 and 716B1 are located farther from the contact portion 71*b*, the volume of the housing 700 that is present between the pressed ribs 716A and 716B and the bearing portion of the development roller 71 becomes larger. Accordingly, variations in the urging forces of the two compression springs 640A have less effects and there is little difference between the force for urging the development roller 71 against the photosensitive drum 61 at the right side and that at the left side. In this case, the pressing direction of each pressing member 640 is parallel to the front-and-back direction.

Accordingly, the pressed ribs 716A and 716B are provided on the front side of the agitation bars 78A and 78B of the first agitator 75A and the second agitator 75B, in the pressing direction of each pressing member 640. More specifically, a rotation center 78B1 of the agitation bar 78B of the second agitator 75B is disposed at a position farther from the rotation center of the development roller 71 than a rotation center of the agitation bar 78A of the first agitator 75A. A distance from the contact portion 71*b* to the pressed portion 716A1 is longer than a distance from the contact portion 71*b* to the rotation center 78B1 of the agitation bar 78B of the second agitator 75B in the front-and-back direction. Similarly, the distance from the contact portion 71*b* to the pressed portion 716B1 (see FIG. 6) is longer than the distance from the contact portion 71*b* to the rotation center 78B1 of the agitation bar 78B of the second agitator 75B. The distance from the rotation center of the development roller 71 to the rotation center 78B1 and the distance from the rotation center of the development roller 71 to the pressed portion 716B1 have a relationship similar to that described above.

Further, as illustrated in FIG. 6, the pressed ribs 716A and 716B are disposed so as to be shifted from each other in the front-and-back direction parallel to the pressing direction of each pressing member 640. More specifically, the pressed rib 716B is disposed on the back side of the pressed rib 716A. As illustrated in FIG. 19, a distance from the contact portion 71*b* that contacts the photosensitive drum 61 of the development roller 71 to the pressed portion (first pressed portion) 716A1 of the pressed rib 716A in the pressing direction of each pressing member 640 (direction of a force F1) is referred to as a distance D4. A distance from the contact portion 71*b* to the pressed portion (second pressed portion) 716B1 of the pressed rib 716B is referred to as a distance D5. In this case, the distance D4 is longer than the distance D5. When the development unit 7 is viewed from the left side, the pressed portion 716B1 is hidden. However, FIG. 19 illustrates the position of the pressed portion 716B1 for convenience of explanation. The pressed portion 716A1 and the pressed portion 716B1 receive the parallel force F1 from the pressing members 640.

An uneven contact of the development roller 71 may occur depending on the positional relationship or the like of the bearing of the development roller 71 of the housing 700. The term "uneven contact" refers to a state where a contact pressure on the photosensitive drum 61 in a portion corresponding to the left side is different from a contact pressure on the photosensitive drum 61 in a portion corresponding to the right side of the development roller 71.

In this manner, the positions of the pressed portions 716A1 and 716B1 are shifted from each other in the pressing direction of each pressing member 640 (front-to-back direction), thereby enabling the occurrence of the uneven contact to be suppressed as described above. To suppress the occurrence of the uneven contact, it is also effective to set the spring pressure of the compression spring 640A that presses the left-side pressing member 640 to be different from the spring pressure of the compression spring 640A that presses the right-side pressing member 640. However, with the configuration in which the positions of the pressed portions 716A1 and 716B1 are shifted from each other in the front-and-back direction as described above, the distance between the pressed portion 716A1 and the contact portion 71*b* can be set to be different from the distance between the pressed portion 716B1 and the contact portion 71*b*, thereby enabling the same compression spring 640A to be used while suppressing the occurrence of the uneven contact. Accordingly, it is possible to reduce costs while stabilizing the right and left contact states between the development roller 71 and the photosensitive drum 61. Depending on the state of the uneven contact, the relationship between the distance between the pressed portion 716A1 and the contact portion 71*b* and the distance between the pressed portion 716B1 and the contact portion 71*b* in the pressing direction of each pressing member 640 may be reversed from the relationship described above.

Further, as illustrated in FIG. 15, the pressed ribs 716A and 716B are disposed so as to be shifted from each other also in a detaching direction Y1 that is orthogonal to each of the pressing direction (direction of the force F1) of each pressing member 640 and the axial direction (right-and-left direction) of the development roller 71. The detaching direction Y1 is a direction in which the pressed portions 716A1 and 716B1 of the development unit 7 move when the development unit 7 starts to detach from the photosensitive member unit 6. The detaching direction Y1 matches the direction of a force received when supported portions 718A and 746A1 that are supported by the photosensitive member unit 6 of the development unit 7 are supported by the photosensitive member unit 6. In the process of detaching the development unit 7 from the photosensitive member unit 6, the locus of the movement of each of the pressed portions 716A1 and 716B1 draws a circular-arc shape about the rotation center of the development roller 71 as indicated by a removal direction LD.

More specifically, the pressed rib 716A is disposed above the pressed rib 716B. Accordingly, the pressed portion 716A1 is disposed above the pressed portion 716B1. In other words, the pressed portion 716A1 is disposed on a downstream side of the pressed portion 716B1 in the detaching direction Y1. In other words, as illustrated in FIG. 19, a distance D6 between the pressed portion 716A1 and the contact portion 71*b* is longer than a distance D7 between the pressed portion 716B1 and the contact portion 71*b* in the detaching direction Y1. The front-and-back direction and the direction of the force F1 are parallel to a horizontal line when the photosensitive member unit 6 on which the development unit 7 is mounted is placed on the horizontal plane, and the up-and-down direction is parallel to the vertical direction. A position above the pressed portion 716B1 in the up-and-down direction refers to a position on the upper side in the up-and-down direction when the photosensitive member unit 6 on which the development unit 7 is mounted is placed on the horizontal plane.

This configuration will be described with reference to FIG. 19. When a moment centered on the contact portion 71*b* of the development roller 71 that contacts the photosensitive drum 61 is taken into consideration, the force F1 that is received by the pressed portions 716A1 and 716B1 from the pressing members 640 acts as a moment M1. As the positions of the pressed portions 716A1 and 716B1 are set on the downstream side of the contact portion 71*b* further in the detaching direction Y1, the moment M1 increases.

In this case, the left-side portion of the development unit 7 is provided with a plurality of gears such as the development roller gear 711, the supply roller gear 712, the first agitator gear 713, the second agitator gear 714, and the idle gears 715A, 715B, 715C. The right-side portion of the development unit 7 is provided with no gears. Accordingly, the weight of the left-side portion of the development unit 7 is heavier than the weight of the right-side portion of the development unit 7. The left-side portion and the right-side portion of the development unit 7 refer to a portion corresponding to one end side and a portion corresponding to the other end side, respectively, with respect to the center of the development unit 7 in the axial direction of the development roller 71. In this case, the left-side pressed portion 716A1 of the development unit is disposed at a downstream position of the right-side pressed portion 716B1 in the detaching direction Y1, so that the moment M1 generated in the left-side portion of the development unit 7 is larger than the moment M1 generated in the right-side portion of the development unit 7.

Accordingly, when the development unit 7 is detached from the frame 610, a moment for lifting the left-side portion of the development unit 7, which has a larger weight, acts, thereby preventing the development unit 7 from being inclined in the right-and-left direction and thus obtaining the excellent usability.

Further, in the present exemplary embodiment, a contact surface (force receiving portion) 751A (see FIG. 7) that receives the force in the Y1 direction from the lift member 642 of the photosensitive member unit 6 is provided only in the right-side portion of the development unit 7. For this reason, the left-side portion of the development unit 7 is less likely to be lifted than the right-side portion of the development unit 7, and thus the left-side portion is more likely to be inclined in the right-and-left direction than the right-side portion is. Therefore, as described above, the configuration in which the moment M1 generated in the left-side portion of the development unit is larger than that in the right-side portion of the development unit 7 prevents the development unit 7 from being inclined in the right-and-left direction and thus provides the excellent usability.

Further, depending on the balance between the weights of the left-side portion and the right-side portion of the development unit 7 and the position of the lift member 642, the positional relationship between the pressed portions 716A1 and 716B1 in the up-and-down direction may be reversed. The development coupling 710 engages with the development drive transmission member, which is provided on the apparatus main body 2, and receives a rotational driving force. When the development coupling 710 receives the rotational driving force, the left-side portion of the development unit 7 receives a moment acting in the direction opposite to the moment M1 about the contact portion 71*b*. Thus, the force that cancels out the moment M1 acting on the left side of the development unit 7 as described above acts, which enables the development unit 7 to be stably fixed to the frame 610.

<Configuration of Development Coupling 710>

As illustrated in FIG. 19, the development coupling 710 is provided with driving force receiving portions 710A to 710D that receive a driving force from the development drive transmission member. The driving force receiving portions 710A to 710D are arranged point-symmetrically about the center of the development coupling 710. With this configuration, a loss of the driving force can be reduced. The driving force receiving portions 710A to 710D are each formed of four surfaces and transmit the driving force using at least three of the four surfaces. An entrance of each of the driving force receiving portions 710A to 710D is provided with an inclined surface for guiding the development drive transmission member to engage with the development drive transmission member provided on the apparatus main body 2.

<Support Configuration of Development Unit 7>

Next, a support configuration of the development unit 7 will be described with reference to FIG. 12. Pressing portions P of the respective pressing members 640 are disposed on an inner side of the region that is coated with toner on the development roller 71 in the right-and-left direction. The width of the region coated with toner on the development roller 71 in the right-and-left direction is determined by inner ends 717A of the end seals 717 of the housing 700 that contact the development roller to regulate leakage of the toner from the housing 700 in the right-and-left direction. Broken lines extending in the front-and-back direction through the two pressing portions P that press the pressed portions 716A1 and 716B1 of the pressing members 640 are respectively referred to as broken lines X1*a* and X1*b*, and broken lines extending in the front-and-back direction through the positions of the inner ends 717A of the end seals 717 are respectively referred to as broken lines X2*a* and X2*b*. The broken lines X1*a* and X1*b* are lines that also pass through the pressed portions 716A1 and 716B1, respectively. In the right-and-left direction, the broken line X1*a* is located on an inner side of the broken line X2*a* and the broken line X1*b* is located on an inner side of the broken line X2*b*.

The urging force of the compression spring 640A is set in such a manner that when an operation portion 642A of the lift member 642 is operated, the development unit 7 can be moved in the removal direction from the photosensitive member unit 6.

As illustrated in FIG. 12, projecting portions 643 that project upward are formed at both ends of the bottom surface 613 of the frame 610 in the right-and-left direction. The projecting portions 643 respectively contact ribs 718 formed at a bottom portion of the housing 700 of the development unit 7 as illustrated in FIG. 13, thereby supporting the housing 700. Assuming that broken lines extending in the front-and-back direction passing through the centers of the respective projecting portions 643 are referred to as broken lines X3*a* and X3*b*, the broken line X3*a* is disposed on an outer side of the broken line X1*a* in the right-and-left direction and the broken line X3*b* is disposed on an outer side of the broken line X1*b* in the right-and-left direction. The terms "outer side" and "inner side" are defined based on the center of the frame 610 in the right-and-left direction. With this configuration, a distance D3 between the broken lines X3*a* and X3*b*, which is a distance between support points of the housing 700 by the frame 610 in the right-and-left direction can be set to be longer than the distance Dl between the broken lines X1*a* and X1*b*, and the development unit 7 can be stably supported.

If the distance D3 is longer than the distance Dl, the broken line X3*a* may be disposed on an inner side of the broken line X1*a*, or the broken line X3*b* may be disposed on an inner side of the broken line X1*b*.

<Lift Mechanism of Development Unit 7>

Figure 14:
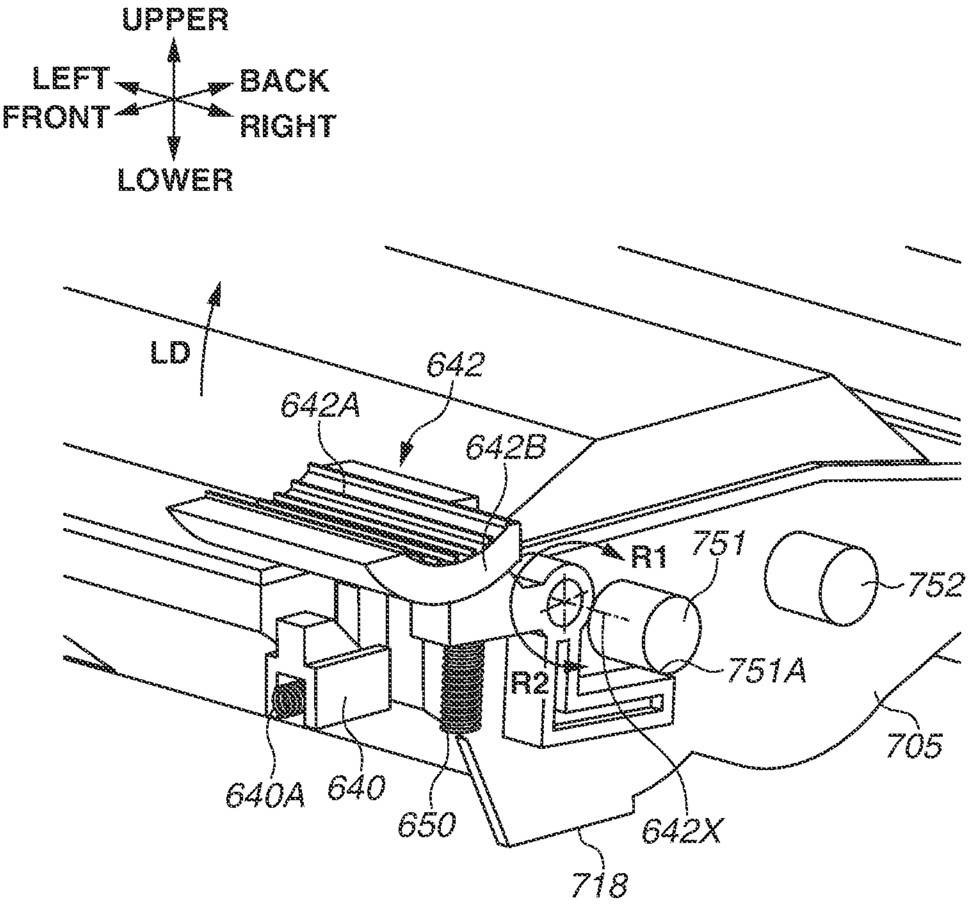
FIG. 14 is a partial perspective view illustrating the development unit and the lift member.
Figure 16A:
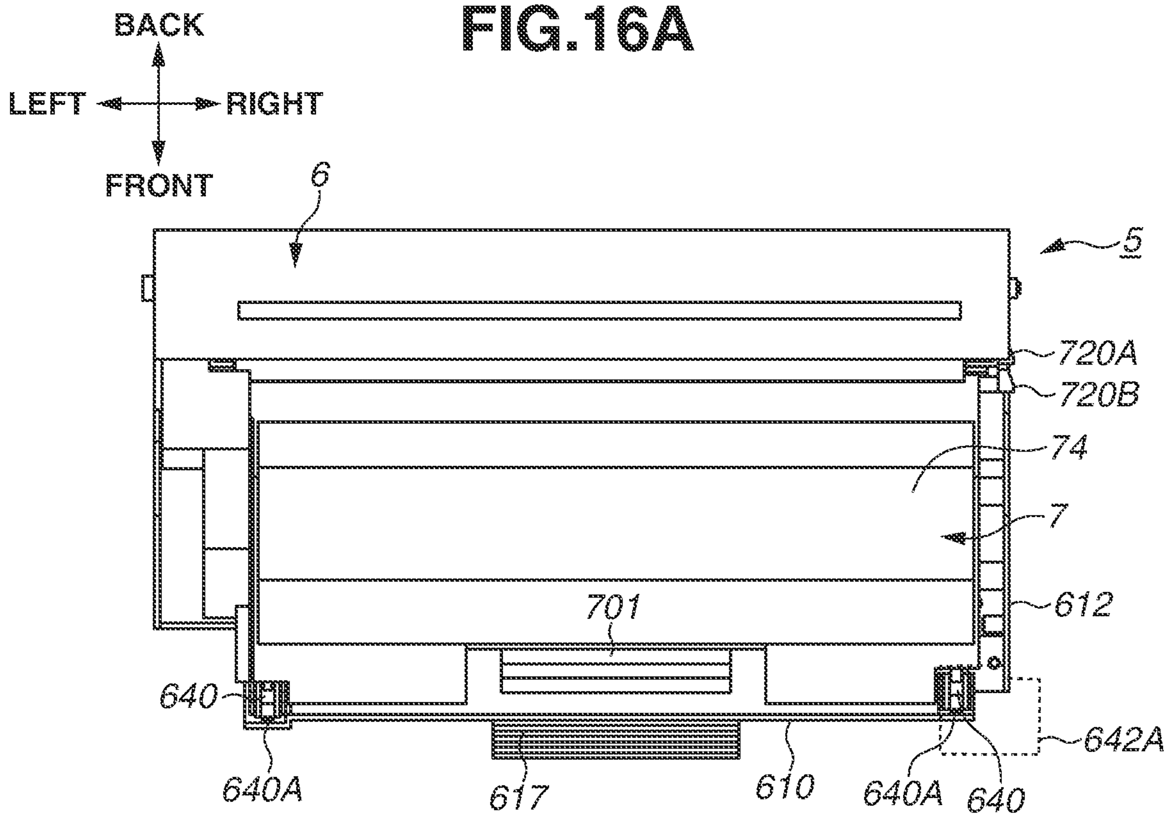
FIGS. 16A and 16B are views each illustrating a positional relationship between the lift member and a pressing member.
Figure 16B:
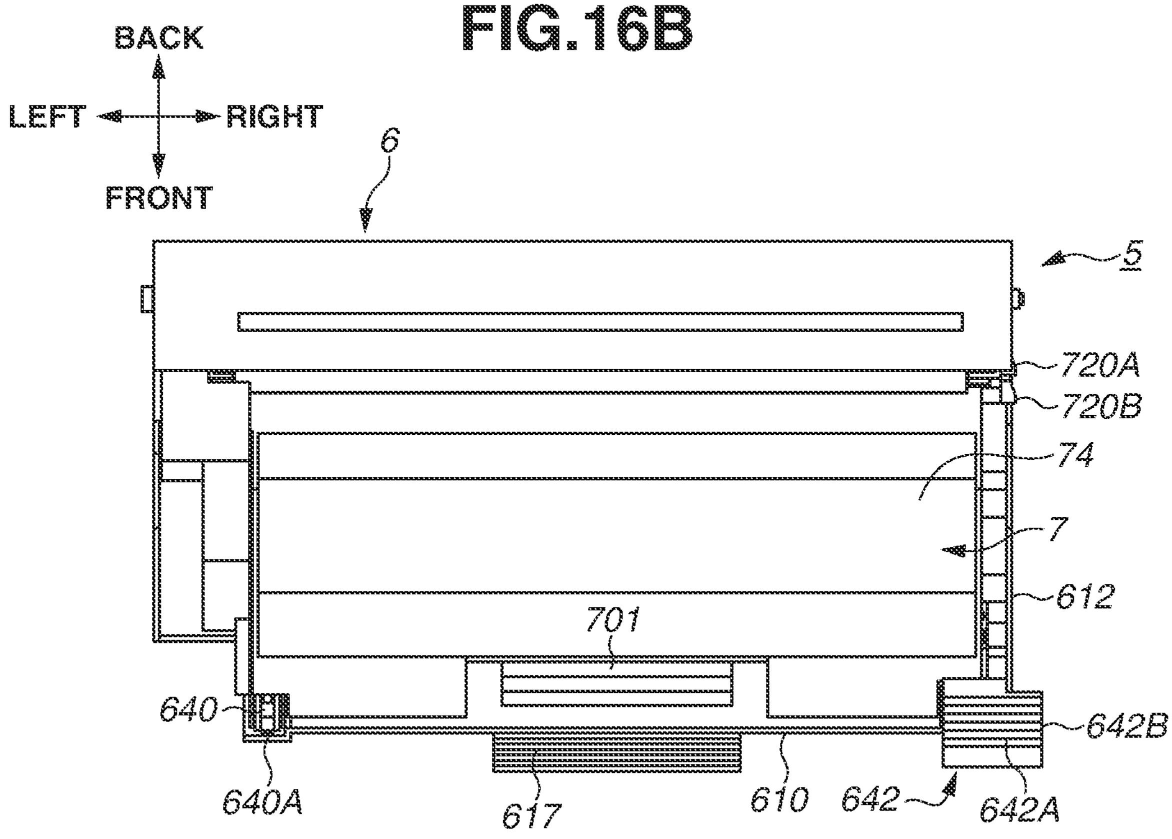
Figure 17A:
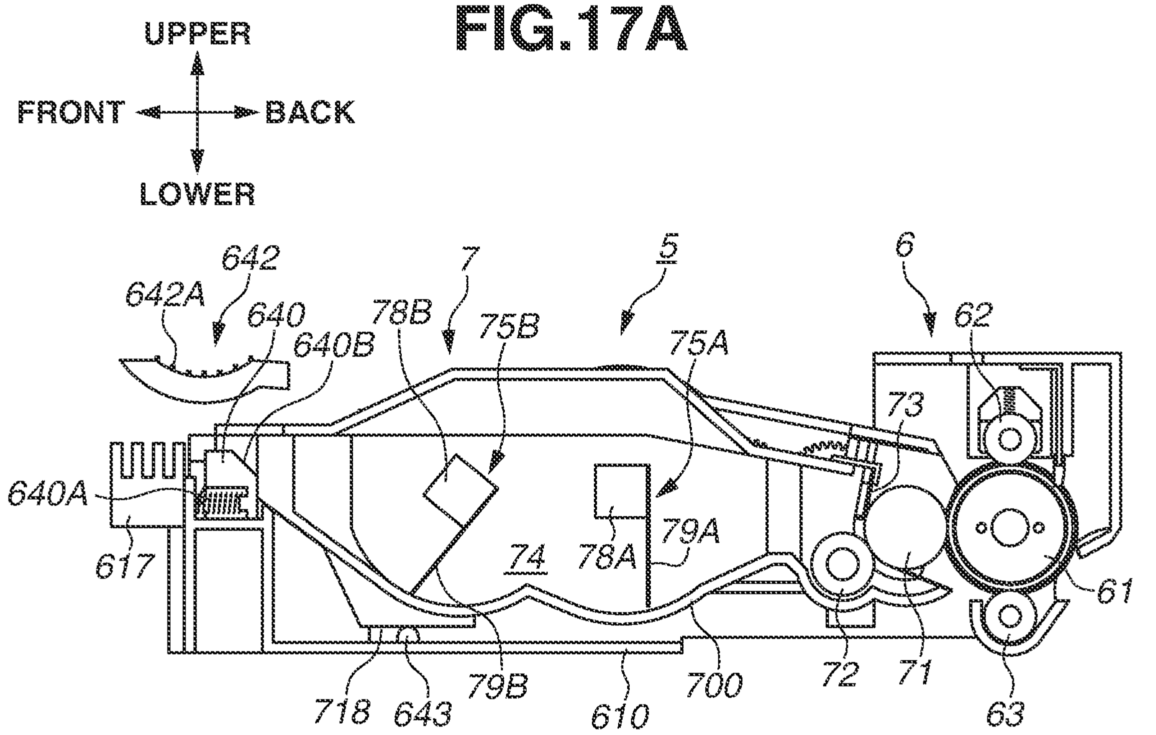
FIGS. 17A and 17B are views each illustrating a state where the development unit is removed.
Figure 17B:
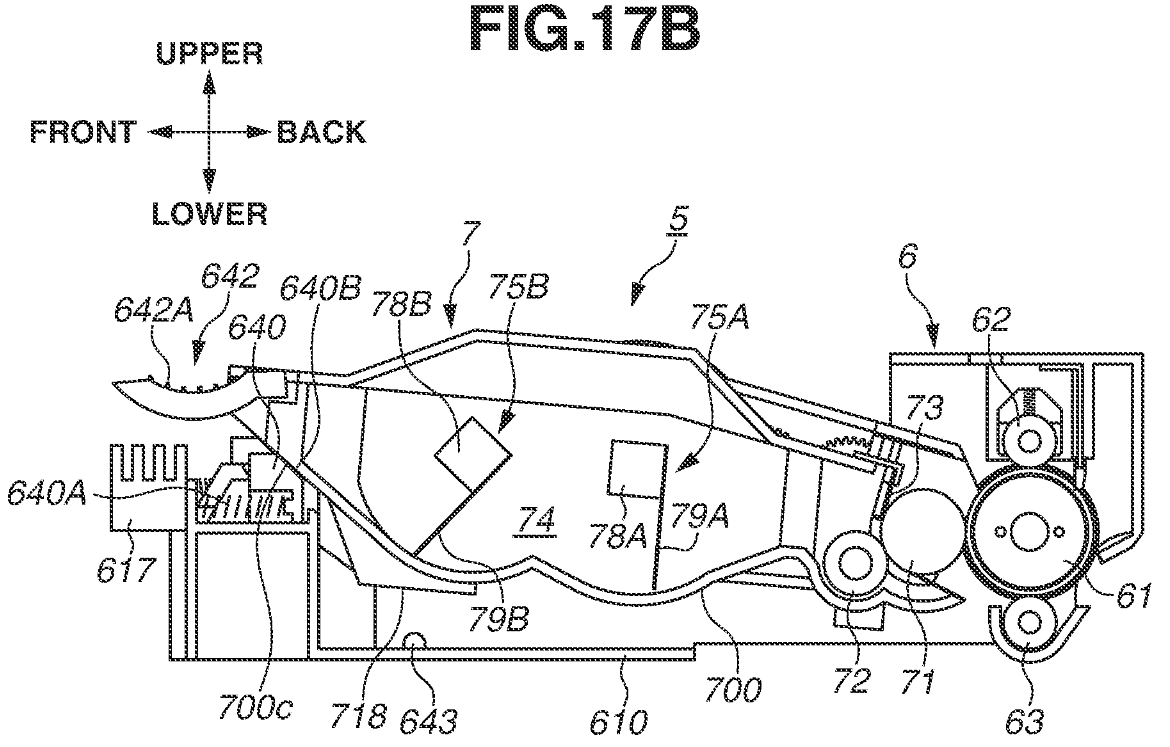

FIG. 14 is a partial perspective view illustrating the development unit 7 and the lift member 642. FIGS. 16A and 16B are top views each illustrating the photosensitive member unit 6 placed on a horizontal plane on which the development unit 7 is mounted. FIG. 16A illustrates the lift member 642 in a see-through manner, and FIG. 16B illustrates the lift member 642 in a non-see-through manner. FIGS. 17A and 17B are sectional views respectively illustrating the photosensitive member unit 6 placed on a horizontal plane and the development unit 7, and the cross-section of each of the photosensitive member unit 6 and the development unit 7 is parallel to the up-and-down direction and the front-and-back direction. FIG. 17A illustrates a state where the development unit 7 is mounted on the photosensitive member unit 6, and FIG. 17B illustrates a state where the development unit 7 is placed on the photosensitive member unit 6.

The development unit 7 mounted on the photosensitive member unit 6 is shifted to a lifted state by a lift mechanism and is then detached from the photosensitive member unit 6. This lift mechanism will be described in detail below.

As illustrated in FIG. 14, the lift member 642 is rotatably supported on the right side wall 612 in a state where the lift member 642 receives a force from a compression spring 650. A rotational axis 642X of the lift member 642 is parallel to the right-and-left direction (axial direction of the photosensitive drum 61). The lift member 642 is urged by the force of the compression spring 650 in a rotation direction R1. The frame 610 is provided with a notch portion 614 so that the rotation locus of the lift member 642 can be secured as illustrated in FIG. 15.

When the user presses the operation portion 642A of the lift member 642 against the force of the compression spring

650 to rotate the lift member 642 in a direction R2, thereby causing the lift member 642 to press projections 751 and causing the development unit 7 to move in the removal direction LD from the photosensitive member unit 6. Thus, the development unit 7 can be detached from the photosensitive member unit 6. The operation portion 642A is disposed at the right end side (one end side) of the photosensitive member unit 6.

The development unit 7 is elongated in the horizontal direction to accommodate a larger amount of toner and has a small thickness in the height direction. Accordingly, when the user operates the operation portion 642A of the lift member 642, it is important that the user can detach the development unit 7 from the photosensitive member unit 6 without feeling a larger load.

As one of the means for reducing the load, the operation portion 642A has a larger area to facilitate the user's operation. As illustrated in FIGS. 16A and 16B, an outermost end 642B that is an outermost end of the operation portion 642A is disposed on the outer side (right side) of the right side wall 612, which is disposed on the right end side of the photosensitive member unit 6, in the rotational axis direction of the lift member 642. Further, the outermost end 642B is disposed on the outer side (right side) of the outermost surface of each of the first electrical contact 720A and the second electrical contact 720B in the rotational axis direction of the operation portion 642A. The terms "outer side" and "inner side" are defined based on the center of the frame 610 in the right-and-left direction. With this configuration, the area of the operation portion 642A of the lift member 642 can be increased while suppressing an increase in the width of the back-side portion, which is a leading end side (downstream side) of the process cartridge 5 in the insertion direction S1, in the right-and-left direction.

When the process cartridge 5 is placed on the horizontal plane, the process cartridge 5 is disposed in such a manner that at least a part of the operation portion 642A of the lift member 642 overlaps the pressing member 640 as viewed from above. In this configuration, the phrase "as viewed from above" has the same meaning as the phrase "as viewed along a direction orthogonal to the insertion direction S1 of the process cartridge 5 and to the right-and-left direction. To express it in another way, the operation portion 642A is disposed at a position overlapping the pressing member 640 when the operation portion 642A and the pressing member 640 are projected on a horizontal plane in the state where the photosensitive member unit 6 is placed on the horizontal plane. With this configuration, a large area can be secured for the operation portion 642A while suppressing an increase in occupied area of the process cartridge 5 as viewed from above. The secured large area of the operation portion 642A enables the user to easily operate the lift member 642.

As illustrated in FIG. 17A, in the state where the development unit 7 is mounted on the photosensitive member unit 6, the pressing member 640 presses the housing 700, thereby pressing the development roller 71 against the photosensitive drum 61. The development unit 7 is locked by the pressing member 640 to prevent the development unit 7 from being removed from the photosensitive member unit 6.

As illustrated in FIGS. 14 and 15, one end of the lift member 642 causes the contact surface (contact portion) 751A of each projection 751 of the housing 700 to move upward. This configuration enables the development unit 7 to move in the removal direction LD from the mounting position where the development unit 7 is mounted on the mounting portion 615 (see FIG. 10), so that the development unit 7 can be removed from the photosensitive member unit 6.

As illustrated in FIG. 17B, in the process of removing the development unit 7, the development unit 7 is kept at a temporary support position where a supported surface 700*c* of the housing 700 is supported on a holding portion 640B of each pressing member 640. The development unit 7 located at the temporary support position is in a state where the rotation shaft 746B (746A) of the development roller 71 is supported on the receiving portions 641. This state is a state (lift-up state) in which the locked state (in which the detachment of the development unit 7 from the photosensitive member unit 6 is regulated) is released and the development unit 7 is lifted up. Accordingly, the gripping portion 701 of the development unit 7 is disposed at an upper position than the position in the mounting state illustrated in FIG. 17A. As a result, the user can easily grip the gripping portion 701. Further, if the development unit 7 is lifted up while the gripping portion 701 is gripped from the lift-up state, the development unit 7 can be detached from the photosensitive member unit 6 without moving another member. In this way, the user can detach the development unit 7 from the photosensitive member unit 6 to mount a new development unit 7 on the photosensitive member unit 6.

Figure 18:
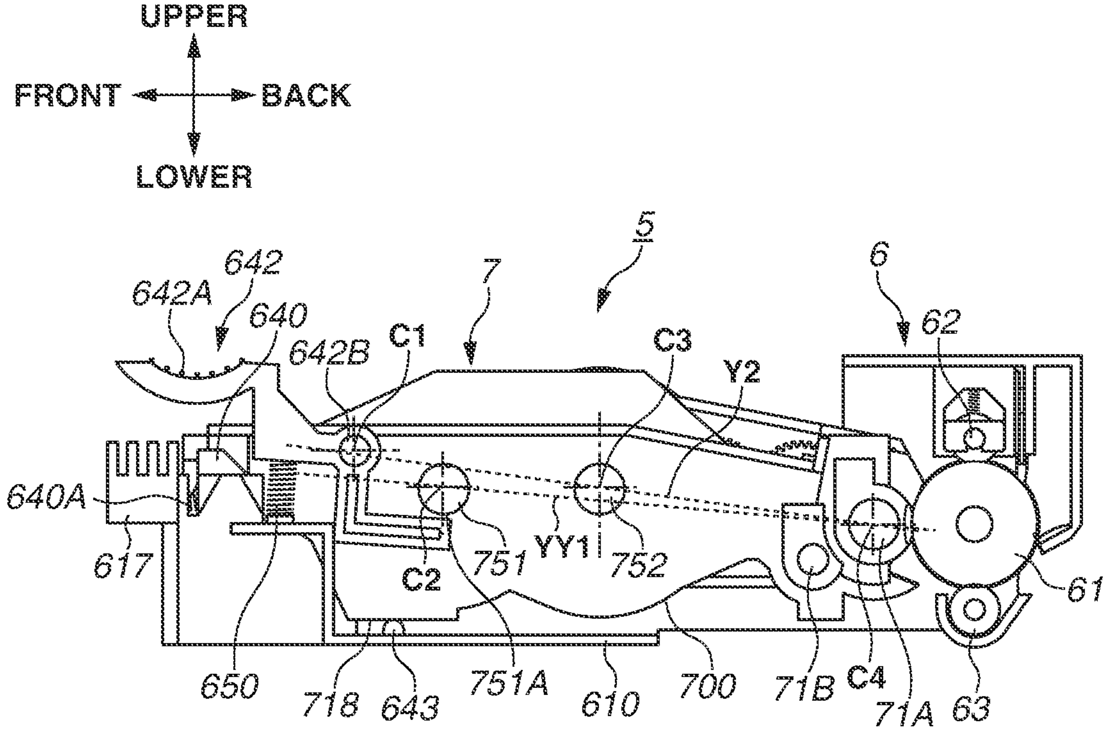
FIG. 18 is a view illustrating the photosensitive member unit on which the development unit is mounted as viewed from the right side.

FIG. 18 is a view illustrating the photosensitive member unit 6 on which the development unit 7 is mounted in a state where the photosensitive member unit 6 is placed on the horizontal plane as viewed from the right side. For convenience of explanation, the illustration of the right side wall 612 of the photosensitive member unit 6 is omitted.

As illustrated in FIG. 18, in the state where the development unit 7 is mounted, the rotation center of the rotation shaft 642B of the lift member 642 is referred to as a center C1, and the center of the projection 751, i.e., the rotation center of the second agitator 75B, is referred to as a center C2. Further, a projection 752, i.e., the rotation center of the first agitator 75A is referred to as a center C3, and the center (rotation center of the development roller 71) of an axial portion 71A of the development roller 71 is referred to as a center C4. A straight line connecting the center C2 and the center C4 is represented by YY1, and a straight line connecting the center C3 and the center C4 is represented by Y2.

In the state where the photosensitive member unit 6 on which the development unit 7 is mounted is placed on the horizontal plane, as the center C1 is set at a higher position, the operation portion 642A can be disposed at a higher position, which facilitates the user's operation. In the state where the photosensitive member unit 6 on which the development unit 7 is mounted is placed on the horizontal plane, the center C1 is disposed above the center C2, the center C3, the straight line YY1, and the straight line Y2 in the up-and-down direction. With this configuration, the operation portion 642A can be disposed at a higher position to thereby maintain the ease of the user's operation, while suppressing an increase in the height of each of the photosensitive member unit 6 and the development unit 7.

To operate the operation portion 642A with a small force to remove the development unit 7, the contact surface 751A that contacts the lift member 642 of the housing 700 is desirably provided at a position that is located as far from the center C4 of the axial portion 71A of the development roller 71 as possible. Accordingly, the contact surface 751A is provided at a position farther from the center C4 than the center C3. In other words, the distance from the center C4 to the contact surface 751A is longer than the distance from the center C4 to the center C3 under the condition that the distance from the center C4 to the center C3 is shorter than the distance from the center C4 to the center C2, as viewed along the rotational axis direction of the photosensitive drum 61.

Figure 7:
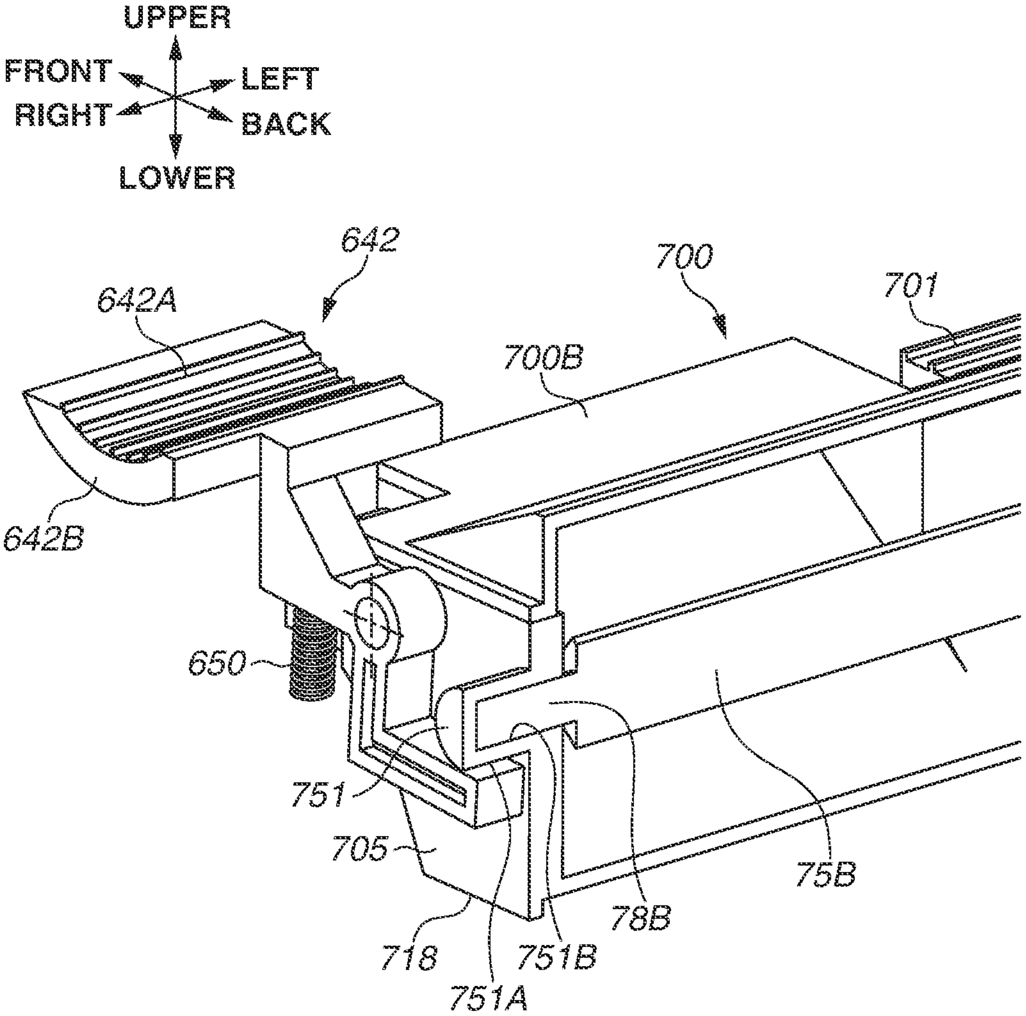
FIG. 7 is a perspective view illustrating the development unit mounted on a photosensitive member unit and a lift member.

FIG. 7 is a perspective view illustrating the development unit 7 mounted on the photosensitive member unit 6 and the lift member 642. For convenience of explanation, FIG. 7 illustrates a state where the development unit 7 is taken along a cross-section passing through the rotational axis of the second agitator 75B.

As illustrated in FIG. 7, the projections 751 pressed from the lift member 642 are formed to project rightward (in the axial direction of the development roller 71) from the right side wall 705 of the housing 700. The projections 751 each have a cylindrical shape with a right side end closed, and the outer peripheral surface of each of the projections 751 is provided with the contact surface 751A that contacts one end of the lift member 642 and is pressed by the one end of the lift member 642. In other words, the contact surface 751A has a circular-arc surface shape. The inner peripheral surface of each projection 751 serves as a bearing portion 751B that rotatably supports the agitation bar 78B as the rotation shaft of the second agitator 75B. In other words, the bearing portion 751B has a circular-arc surface shape. The bearing portion 751B, which is the inner peripheral surface of the projection 751, is not limited to the bearing of the agitation bar 78B, but instead may be, for example, a bearing of the agitation bar 78A, or a bearing of a rotary member, such the rotation shaft of the supply roller 72, or the rotation shaft of the development roller 71.

With this configuration, a larger space can be secured on the right side of the right side wall 705 of the housing 700 than in the configuration in which the projection for providing the contact surface 751A and the projection for providing the bearing portion 751B are formed as separate projections projecting from the side wall 705. Accordingly, the degree of freedom of design of the housing 700 and the photosensitive member unit 6 can be increased, and the housing 700 and the photosensitive member unit 6 can be downsized. The inner peripheral surface and the outer peripheral surface of each projection 751 may have a shape other than the circular-arc (cylindrical) surface shape. More specifically, the inner peripheral surface and the outer peripheral surface of each projection 751 may be formed of a flat surface, and the contact surface 751A and the bearing portion 751B may be formed on the flat surface.

Modified Example 1

Figure 21:
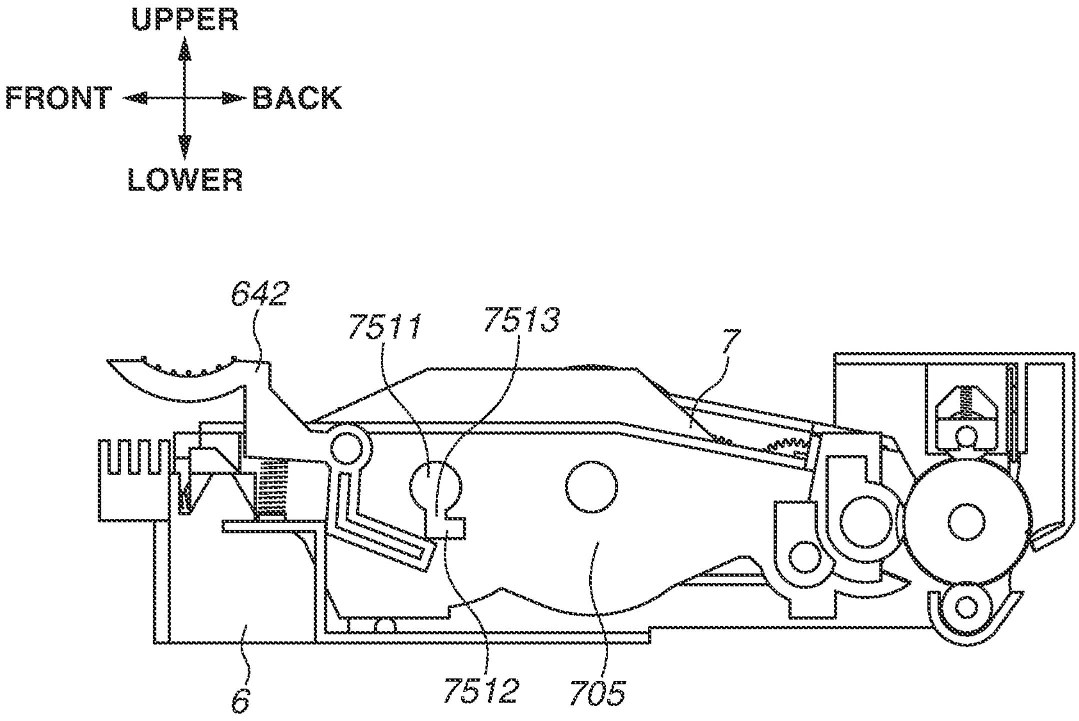
FIG. 21 is a view illustrating the photosensitive member unit on which the development unit is mounted as viewed from the right side.

FIG. 21 is a view illustrating the photosensitive member unit 6 placed on a horizontal plane on which the development unit 7 according to a modified example 1 is mounted as viewed from the right side. As illustrated in FIG. 21, a first projection 7511, which has an inner peripheral surface serving as the bearing portion 751B, and has a cylindrical shape, a second projection 7512 having an outer peripheral surface on which the contact surface 751A is formed, and an intermediate portion 7513 that connects the first projection 7511 and the second projection 7512 may be provided. The first projection 7511, the second projection 7512, and the intermediate portion 7513 are formed so as to project rightward (in the axial direction of the development roller 71) from the right side wall 705 of the housing 700. With this configuration, the strength of each of the two projections (the first projection 7511 and the second projection 7512) can be increased as compared with the configuration in which the projection for providing the contact surface 751A and the projection for providing the bearing portion 751B are formed as separate projections projecting from the right side wall 705.

Modified Example 2

Figure 22:
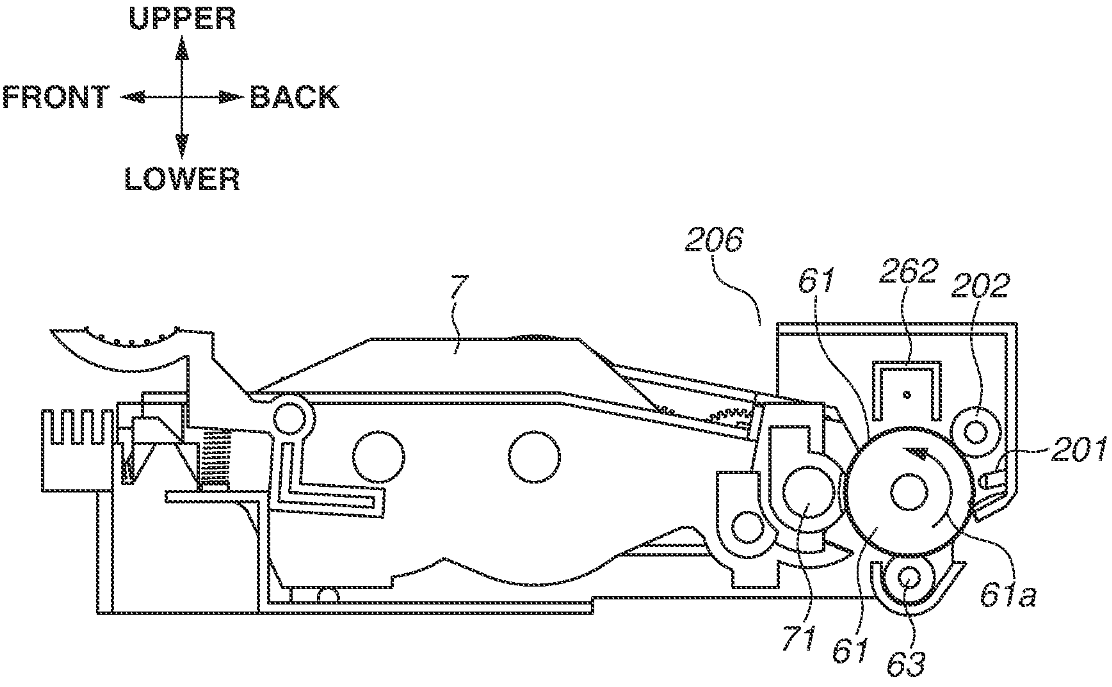
FIG. 22 is a view illustrating the photosensitive member unit on which the development unit is mounted as viewed from the right side.

Next, a photosensitive member unit 206 according to a modified example 2 will be described. FIG. 22 is a view illustrating the photosensitive member unit 206 according to the modified example 2 on which the development unit 7 is mounted in a state where the photosensitive member unit 206 is placed on a horizontal plane as viewed from the right side. For convenience of explanation, the illustration of the right side wall of the photosensitive member unit 206 is omitted.

The photosensitive member unit 206 according to the modified example 2 is different from the photosensitive member unit 6 described above in that the photosensitive member unit 206 includes a corona charger 262 in place of the charging roller 62 and the photosensitive member unit 206 further includes a pre-exposure portion 201 and a collection roller 202. The other configurations of the photosensitive member unit 206 according to the modified example 2 is similar to that of the photosensitive member unit 6, and thus the descriptions thereof are omitted.

The corona charger 262 is a charging unit that charges the surface of the photosensitive drum 61 in a non-contact state. The pre-exposure portion 201 includes a light-emitting diode as a light source and a light guide as a light guide member. The light guide guides light emitted from the light-emitting diode, and the surface of the photosensitive drum 61 is irradiated with the light. A current to be supplied to the light-emitting diode is supplied from the apparatus main body 2. The surface of the photosensitive drum 61 is neutralized by the irradiation of light from the pre-exposure portion 201. A predetermined voltage from the apparatus main body 2 is applied to the collection roller 202 to collect foreign substances, such as paper dust and waste, and toner which are attached to the surface of the photosensitive drum 61. The transfer roller 63, the pre-exposure portion 201, the collection roller 202, the corona charger, and the development roller 71 are arranged side by side in this order from the upstream side to the downstream side in the rotation direction (as indicated by an arrow 61*a*) during formation of an image on the surface of the photosensitive drum 61.

While the present invention has been described with reference to exemplary embodiments, it is to be understood that the invention is not limited to the disclosed exemplary embodiments.

What is claimed is:

1. A cartridge comprising:

a developing unit including a developing roller and a developing frame supporting the developing roller, the developing frame including a first receiving surface;

a drum unit to which the developing unit is detachably attached, the drum unit including a photosensitive drum being rotatable about a rotation axis which extends in a first direction, a transfer roller contacting the photosensitive drum, a corona charger for charging the photosensitive drum, a drum frame supporting the photosensitive drum, the drum frame including (i) a first side wall extending in a direction crossing the first direction, (ii) a second side wall extending in a direction crossing the first direction, (iii) a bottom portion connecting the first side wall and the second side wall, and (iv) a support projection projecting from the bottom portion, wherein the first side wall, the second side wall and the support projection support the developing unit, and are disposed such that the developing unit is disposed between the first side wall and the second side wall in the first direction, a first pressing member, a first compression spring pressing the first pressing member against the first receiving surface such that the developing roller is pressed against the photosensitive drum, the first compression spring including (i) a first received end being received by the first pressing member so as to press the first pressing member and (ii) a second received end opposite to the first received end and being received by the drum frame, a lifting lever configured to move the developing unit in a removal direction from the drum unit, the lifting lever including a surface on which projections are provided, and a lever spring configured to urge the lifting lever, and disposed between the lifting lever and the drum frame, wherein in a state where the drum unit is placed on a horizontal plane so that the surface faces upward, at least one of the projections is further from the photosensitive drum than the first received end is in a second direction orthogonal to the first direction and parallel to a horizontal direction, one end of the lifting lever is closer to the photosensitive drum than the first pressing member is in the second direction, and the one end of the lifting lever is closer to the photosensitive drum than the support projection is in the second direction.

2. The cartridge according to claim 1, wherein the developing frame includes a second receiving surface, and the drum unit includes a second pressing member and a second compression spring pressing the second pressing member against the second receiving surface such that the developing roller is pressed against the photosensitive drum.

3. The cartridge according to claim 2, wherein the developing unit includes a supply roller configured to supply developer to the developing roller, a driving force receiving member configured to receive a driving force for rotating the developing roller, a first electrical contact electrically connected with the developing roller, and a second electrical contact electrically connected with the supply roller.

4. The cartridge according to claim 3, wherein the driving force receiving member is configured to transmit the diving force to the developing roller and the supply roller.

5. The cartridge according to claim 4, further comprising:

a developing gear attached to the developing roller; and a supply gear attached to the supply roller, wherein the driving force receiving member includes a coupling portion and a gear portion, the coupling portion is configured to receive the driving force, and the gear portion is configured to directly mesh with the developing gear and the supply gear.

6. The cartridge according to claim 3, wherein the developing unit includes an agitator for agitating the developer, an agitator gear connected to the agitator, and a cover attached to the developing frame so as to cover the agitator gear, wherein the developing frame accommodates the developer and the agitator, and wherein the cover is provided with an opening into which the driving force receiving member is inserted.

7. The cartridge according to claim 3, wherein a position of the first pressing portion is offset from a position of a center of the support projection in the first direction, and wherein the first pressing member and the support projection are located in one end side with respect to a center of the drum frame in the first direction, a position, where the support projection contacts the developing frame, is closer to the photosensitive drum than a position, where the first pressing member contacts the first receiving surface, is in a first pressing direction in which the first pressing member presses the first receiving surface.

8. The cartridge according to claim 1, wherein in the state where the drum unit is placed on the horizontal plane so that the surface faces upward, a distance between the one end of the lifting lever and the first pressing member is longer than a distance between the other end of the lifting lever in the second direction.

9. A cartridge comprising:

a developing unit including a developing roller and a developing frame supporting the developing roller, the developing frame including a first receiving surface;

a drum unit to which the developing unit is detachably attached, the drum unit including a photosensitive drum being rotatable about a rotation axis which extends in a first direction, a transfer roller contacting the photosensitive drum, a corona charger for charging the photosensitive drum, a drum frame supporting the photosensitive drum, the drum frame including (i) a first side wall extending in a direction crossing the first direction, (ii) a second side wall extending in a direction crossing the first direction, (iii) a bottom portion connecting the first side wall and the second side wall, and (iv) a support projection projecting from the bottom portion, wherein the first side wall, the second side wall and the support projection support the developing unit, and are disposed such that the developing unit is disposed between the first side wall and the second side wall in the first direction, a first pressing member, a first compression spring pressing the first pressing member against the first receiving surface such that the developing roller is pressed against the photosensitive drum, the first compression spring including (i) a first received end being received by the first pressing member so as to press the first pressing member and (ii) a second received end opposite to the first received end and being received by the drum frame, a lifting lever configured to move the developing unit in a removal direction from the drum unit, the lifting lever including a surface on which projections are provided, wherein in a state where the drum unit is placed on a horizontal plane so that the surface faces upward, at least one of the projections is further from the photosensitive drum than the first received end is in a second direction orthogonal to the first direction and parallel to a horizontal direction, one end of the lifting lever is closer to the photosensitive drum than the first pressing member is in the second direction, and the one end of the lifting lever is closer to the photosensitive drum than the support projection is in the second direction, and wherein in the state where the drum unit is placed on the horizontal plane so that the surface faces upward, a distance between the one end of the lifting lever and the first pressing member is longer than a distance between the other end of the lifting lever in the second direction.

10. The cartridge according to claim 9, wherein the developing frame includes a second receiving surface, and the drum unit includes a second pressing member and a second compression spring pressing the second pressing member against the second receiving surface such that the developing roller is pressed against the photosensitive drum.

11. The cartridge according to claim 10, wherein the developing unit includes a supply roller configured to supply developer to the developing roller, a driving force receiving member configured to receive a driving force for rotating the developing roller, a first electrical contact electrically connected with the developing roller, and a second electrical contact electrically connected with the supply roller.

12. The cartridge according to claim 11, wherein the driving force receiving member is configured to transmit the diving force to the developing roller and the supply roller.

13. The cartridge according to claim 12, further comprising:

a developing gear attached to the developing roller; and a supply gear attached to the supply roller, wherein the driving force receiving member includes a coupling portion and a gear portion, the coupling portion is configured to receive the driving force, and the gear portion is configured to directly mesh with the developing gear and the supply gear.

14. The cartridge according to claim 11, wherein the developing unit includes an agitator for agitating the developer, an agitator gear connected to the agitator, and a cover attached to the developing frame so as to cover the agitator gear, wherein the developing frame accommodates the developer and the agitator, and wherein the cover is provided with an opening into which the driving force receiving member is inserted.

15. The cartridge according to claim 11, wherein a position of the first pressing portion is offset from a position of a center of the support projection in the first direction, and wherein the first pressing member and the support projection are located in one end side with respect to a center of the drum frame in the first direction, a position, where the support projection contacts the developing frame, is closer to the photosensitive drum than a position, where the first pressing member contacts the first receiving surface, is in a first pressing direction in which the first pressing member presses the first receiving surface.

* * * * *